(12) United States Patent
Hatsuda et al.

(10) Patent No.: US 7,509,014 B2
(45) Date of Patent: Mar. 24, 2009

(54) TWO-DIMENSIONAL PHOTONIC CRYSTAL HAVING AIR-BRIDGE STRUCTURE AND METHOD FOR MANUFACTURING SUCH A CRYSTAL

(75) Inventors: Ranko Hatsuda, Chuo-ku (JP); Susumu Noda, Uji (JP); Takashi Asano, Kyoto (JP); Yoshinori Tanaka, Kyoto (JP); Eiji Miyai, Kyoto (JP)

(73) Assignees: Kyoto University, Kyoto (JP); TDK Corporation, Tokyo (JP)

( * ) Notice: Subject to any disclaimer, the term of this patent is extended or adjusted under 35 U.S.C. 154(b) by 0 days.

(21) Appl. No.: 12/004,029

(22) Filed: Dec. 20, 2007

(65) Prior Publication Data

US 2008/0145012 A1 Jun. 19, 2008

Related U.S. Application Data

(62) Division of application No. 10/569,879, filed as application No. PCT/JP2004/012405 on Aug. 27, 2004, now Pat. No. 7,333,703.

(30) Foreign Application Priority Data

Aug. 29, 2003 (JP) .............................. 2003-307657
Dec. 8, 2003 (JP) .............................. 2003-409208
Dec. 8, 2003 (JP) .............................. 2003-409209

(51) Int. Cl.
G02B 6/00 (2006.01)
G02B 6/10 (2006.01)

(52) U.S. Cl. .................. 385/132; 385/122; 385/129; 385/130; 385/131

(58) Field of Classification Search ............. 385/122, 385/129–132
See application file for complete search history.

(56) References Cited

U.S. PATENT DOCUMENTS 6,466,709 B1 10/2002 Scherer et al.

6,711,200 B1 * 3/2004 Scherer et al. ............. 372/64
2002/0009277 A1 1/2002 Noda et al.

(Continued)

FOREIGN PATENT DOCUMENTS

EP 1 136 853 A1 9/2001

(Continued)

OTHER PUBLICATIONS

Hatsuda et al., "26a-YA-5 2 jigen Photonic Kessho Slab ni Okeru Ten Kekkan no Q-chi—Air-Bridge Kozo to Teiyudenritsu Clad o Nokoshita Kozo tono Hikaku-," Japan Society of Applied Physics, vol. 3, p. 918 (Sep. 20020.

(Continued)

*Primary Examiner*—Frank G Font
*Assistant Examiner*—Jerry Blevins
(74) *Attorney, Agent, or Firm*—Oliff & Berridge, PLC

(57) ABSTRACT

The present invention intends to provide a two-dimensional photonic crystal having a high level of mechanical strength and functioning as a high-efficiency resonator. The two-dimensional photonic crystal according to the present invention includes a slab layer 31 under which a clad layer 32 is located. In the slab layer 31, areas 35 having a refractive index different from that of the slab layer 31 are cyclically arranged to create a two-dimensional photonic crystal. A portion of the cyclic arrangement of the areas 35 are omitted to form a point-like defect 36. This defect 36 functions as a resonator at which a specific wavelength of light resonates. An air-bridge cavity 37 facing the point-like defect 36 is formed over a predetermined range of the clad layer 32. In this construction, the clad layer 32 supports the slab layer 31 except for the range over which the air-bridge space 37 is formed. Therefore, the two-dimensional photonic crystal has a high level of mechanical strength. The presence of the air-bridge space 37 under the point-like defect 36 makes it easy to confine light at the point-like defect 36 by the difference in the refractive index between the slab layer 31 and the air. Thus, the point-like defect 36 functions as a high-performance resonator.

12 Claims, 16 Drawing Sheets

U.S. PATENT DOCUMENTS

| | | |
|---|---|---|
| 2002/0105000 A1 | 8/2002 | Abe |
| 2002/0191933 A1 | 12/2002 | Tokushima |
| 2004/0062505 A1* | 4/2004 | Sugitatsu et al. ............. 385/131 |
| 2004/0081388 A1* | 4/2004 | Koyama ....................... 385/16 |
| 2005/0152656 A1 | 7/2005 | Talneau et al. |

FOREIGN PATENT DOCUMENTS

| | | |
|---|---|---|
| FR | 2 832 513 | 5/2003 |
| JP | A 2001-272555 | 10/2001 |
| JP | A 2002-189135 | 7/2002 |
| JP | A 2003-279764 | 10/2003 |
| JP | A 2004-109627 | 4/2004 |
| JP | A 2004-111766 | 4/2004 |
| WO | WO 02/088798 A1 | 11/2002 |
| WO | WO 03/023471 | 3/2003 |
| WO | WO 03/023473 | 3/2003 |

OTHER PUBLICATIONS

Painter et al., "Room Temperature Photonic Crystal Defect Lasers at Near-Infrared Wavelength in InGaAsp," Journal of Lightwave Technology, 'II. Fabrication', vol. 17, No. 11, pp. 2082-2088, Figs. 1 to 5 (Nov. 1999).

Tanaka et al., "1a-ZM-12 SOI-gata 2 jigen Photonic Kessho Ten Kekkan Kyoshinki no Q-chi no Kaizen—Riron Kaiseki-Kekkan Kyoshinki," Japan Society of Applied Physics, vol. 3, p. 942 (Aug. 30, 2003).

Eiji Miyai et al., "25p-YA-5, Analysis on Coupling Between 2D Photonic Crystal Waveguide and External Waveguide(2)," The Japan Society of Applied Physics, Sep. 2002.

Eiji Miyai et al., "Analysis of Coupling Between Two-Dimension Photonic Crystal Waveguide and External Waveguide," Applied Physics Letters, vol. 81, No. 20, Nov. 2002.

Ranko Hatsuda et al., "28p-YN-11, Measurement of Optical Transmittance Through 2D Photonic Crystal Waveguide with External Waveguide," The Japan Society of Applied Physics, Mar. 2003.

Pierre R. Villeneuve et al., "Air-Bridge Microcavities," Applied Physics Letters, AIP, American Institute of Physics, Jul. 10, 1995, pp. 167-169, vol. 67, No. 2.

Daniel J. Ripin et al., "One-Dimensional Photonic Bandgap Microcavities for Strong Optical Confinement in GaAs and GaAs/A10 Semiconductor Waveguides," Journal of Lightwave Technology, Nov. 1999, p. 2152, vol. 17, No. 11.

Jerry C. Chen et al., "Optical Filters from Photonics Band Gap Air Bridges," Journal of Lightwave Technology, Nov. 1996, p. 2575, vol. 14, No. 11.

P. Sanchis et al., "High Efficiency Coupling Technique for Planar Photonic Crystal Waveguides," Electronics Letters, IEE Stevenage, Aug. 15, 2002, pp. 961-962, vol. 38, No. 17.

* cited by examiner

Fig. 1
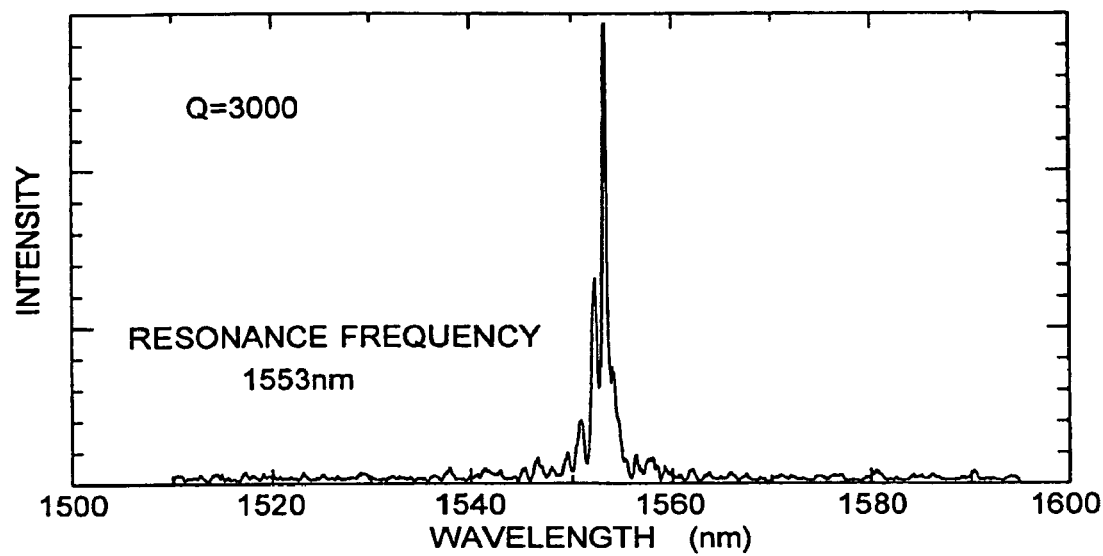
(a) Q=3000, RESONANCE FREQUENCY 1553nm
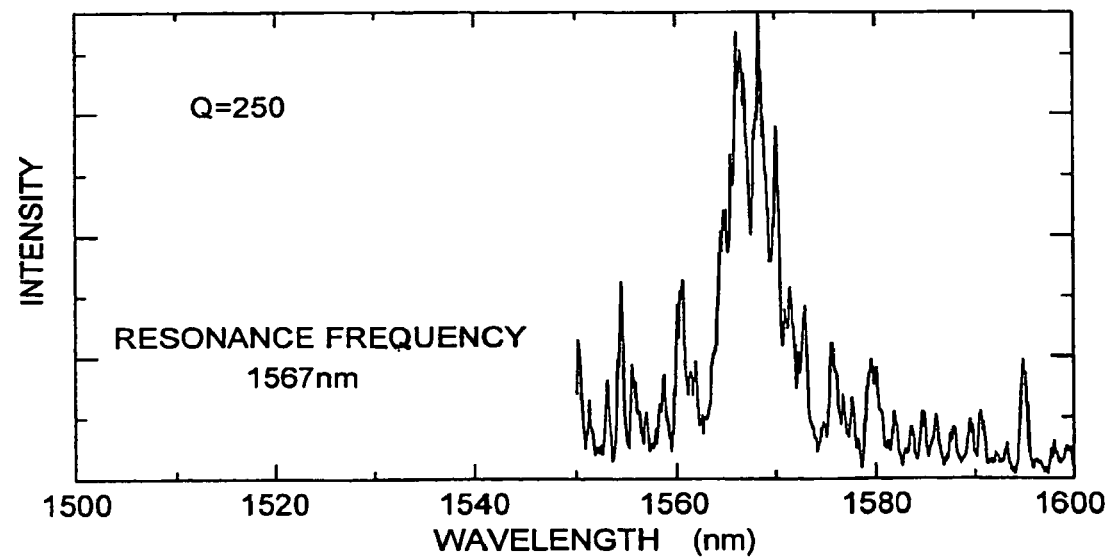
(b) Q=250, RESONANCE FREQUENCY 1567nm Fig. 11
(a)
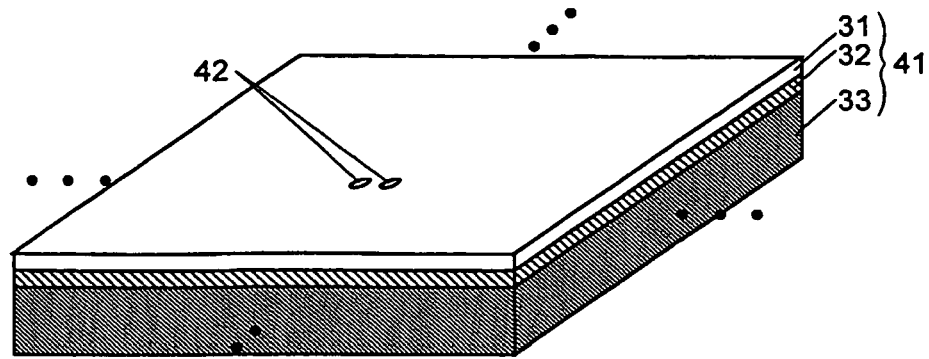
(b)
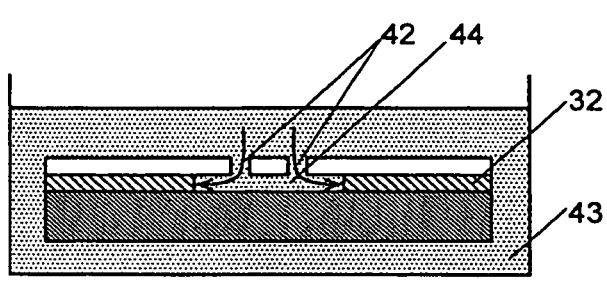
(c-1)
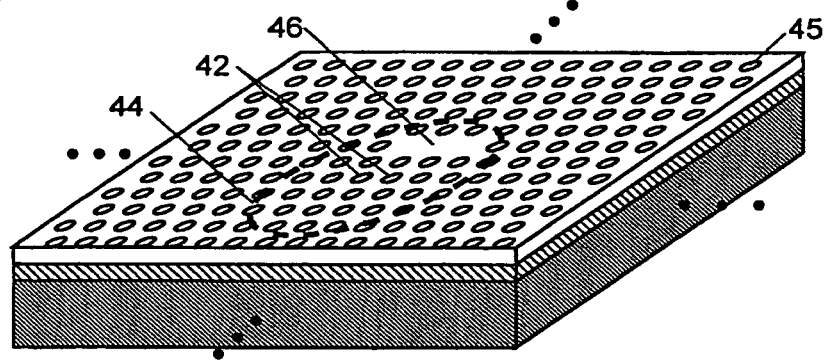
(c-2)
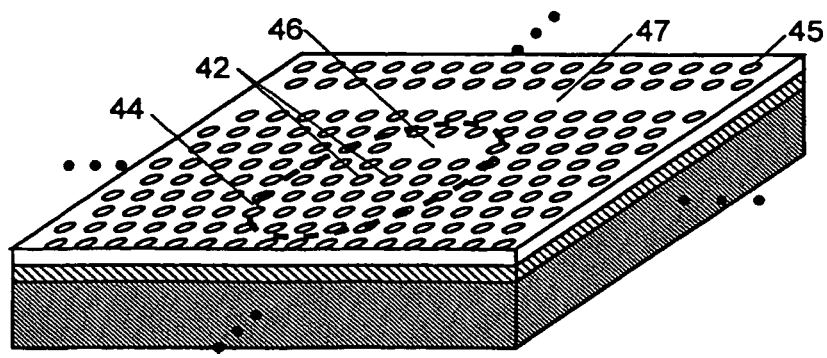

US 7,509,014 B2

TWO-DIMENSIONAL PHOTONIC CRYSTAL HAVING AIR-BRIDGE STRUCTURE AND METHOD FOR MANUFACTURING SUCH A CRYSTAL

This is a Division of application Ser. No. 10/569,879 filed Feb. 28, 2006, which in turn is a National Stage of Application No. PCT/JP2004/012405 filed Aug. 27, 2004. The disclosure of the prior application is hereby incorporated by reference herein in its entirety.

TECHNICAL FIELD

The present invention relates to a two-dimensional photonic crystal applicable for an optical multiplexer/demultiplexer, or similar devices, used in wavelength division multiplexing communication or other technologies. Particularly, it relates to a two-dimensional photonic crystal having a structure in which a slab of the two-dimensional photonic crystal is located on a clad layer having a space partially formed inside, and a method for manufacturing such a device. In the present patent application, such a structure is called the "air-bridge structure" and the space is called the "air-bridge space."

BACKGROUND ART (1) Photonic Crystals

Recently, photonic crystals, which are optical functional materials having a cyclic distribution of refractive index, have been gaining attention. A photonic crystal is characterized in that its cyclic distribution of refractive index forms a band structure with respect to the energy of light or electromagnetic waves, thereby creating an energy region (called the photonic bandgap) that disallows the propagation of light or electromagnetic waves. It should be noted that this specification uses the term "light" or "optical" as waves. It should be noted that this specification uses the term "light" or "optical" as inclusive of electromagnetic waves.

Introduction of an appropriate defect into the photonic crystal will create an energy level (called the defect level) within the photonic bandgap. This allows only a specific wavelength of light having an energy corresponding to the defect level to exist within the wavelength (or frequency) range corresponding to the energy levels included in the photonic bandgap. Forming a linear defect will provide a waveguide, and forming a point-like defect will provide an optical resonator. The resonance wavelength, i.e. the wavelength of light that resonates at the point-like defect, depends on the shape and refractive index of the defect.

Using such resonators and waveguides, research has been conducted to manufacture various types of optical devices. For example, the resonator can be located in proximity to the waveguide to create a multiplexer/demultiplexer capable of functioning as the following two devices: an optical demultiplexer for extracting a ray of light whose wavelength equals the resonance wavelength of the resonator from rays of light having different wavelengths and propagating through the waveguide, and for emitting the extracted light through the resonator to the outside; and an optical multiplexer for trapping a ray of light having the resonance wavelength of the resonator from the outside, and for introducing the trapped light through the resonator into the waveguide. Such a multiplexer/demultiplexer can be used, for example, in the field of optical communications for wavelength division multiplexing communication in which rays of light having different wavelengths are propagated through a single waveguide, with each ray of light carrying a different signal.

Photonic crystals can be created from one-dimensional, two-dimensional or three-dimensional crystal, of which two-dimensional crystals are advantageous in that they are relatively easy to manufacture. For example, Patent Document 1 discloses a two-dimensional photonic crystal and an optical multiplexer/demultiplexer, each of which includes a two-dimensional photonic crystal consisting of a plate (or slab) with a high refractive index and including a cyclic array of a material whose refractive index is lower than that of the material of the plate, where a waveguide is formed by creating a linear defect of the cyclic array, and a point-like defect (or a resonator) that disorders the cyclic array is formed in proximity to the waveguide. In the present patent application, a waveguide formed within the two-dimensional photonic crystal as described above is called the "in-crystal waveguide."

[Patent Document 1] Japanese Unexamined Patent Publication No. 2001-272555 (paragraphs 0019-0032; FIG. 1)

In the most typical construction of the two-dimensional photonic crystal, the low refractive index areas cyclically arranged within the slab made of a high refractive index material are made of air (namely, they are holes); this construction yields the largest possible difference in refractive index and is easy to manufacture.

In the two-dimensional photonic crystal described in Patent Document 1, the slab is in contact with air on its upper and lower sides. Since, as explained previously, the difference in the refractive index between the slab and air is large, most of light propagating through the in-crystal waveguide is confined within the slab due to the total reflection, so that a high level of propagating efficiency is obtained.

(2) Relationship Between the Substrate of the Two-dimensional Photonic Crystal and a Resonator (Point-like Defect)

In general, the slab is relatively weak in its thickness direction because it should be very thin, as known from Patent Document 1 disclosing an embodiment where the thickness is approximately 0.25 μm. Particularly, two-dimensional photonic crystals created by forming a number of holes in the slab are very fragile in the thickness direction. Lack of the strength in the thickness direction will cause some problems, such as a low level of product yield.

A possible method for strengthening the two-dimensional photonic crystal is to use a substrate (or clad) to support the two-dimensional photonic crystal (this structure is called the "substrate-attached photonic crystal" hereinafter). In this case, the upper surface of the crystal is in contact with air while the lower surface is in contact with the substrate.

However, the characteristics of a point-like defect formed as a resonator in a substrate-attached photonic crystal will be poorer than that of a point-like defect formed in a "substrate-less photonic crystal," i.e. a two-dimensional photonic crystal in which the slab is in contact with air on both the upper and lower surfaces. FIGS. 1(a) and 1(b) show experimentally measured spectrums of the resonance wavelength of resonators consisting of point-like defects formed in a substrate-less photonic crystal (FIG. 1(a)) and a substrate-attached photonic crystal (FIG. 1(b)) having the same shape except for the presence of the substrate. The half-width of the spectrum in FIG. 1(b) is larger than that shown in FIG. 1(a). Therefore, the substrate-attached photonic crystal is less advantageous than the substrate-less photonic crystal with respect to the wavelength resolution of the resonator. Also, the Q-value, which indicates the performance of resonators, is Q=3,000 for FIG. 1(a) and Q=250 for FIG. 1(b), which means that a larger amount of light energy is lost from the resonator of the substrate-attached photonic crystal.

(3) Relationship Between the Substrate and a Wire Waveguide

The present inventors have been studying two-dimensional photonic crystals having a wire waveguide; it consists of a two-dimensional photonic crystal with a wire waveguide connected to it in order to introduce light from the outside into the in-crystal waveguide of the two-dimensional photonic crystal or extract light from the in-crystal waveguide to the outside. FIG. 2 shows an example. The two-dimensional photonic crystal 10 is formed by cyclically arranging holes 12 in the slab 11, and an in-crystal waveguide 13 is formed by omitting one line of the holes 12. The wire waveguide 14 is connected on an extension of the in-crystal waveguide. By making the wire waveguide from the same material as that of the slab, it is possible to integrate the two-dimensional photonic crystal with the wire waveguide.

The present inventors have calculated the relationship between the frequencies and the wave numbers of light propagating through the in-crystal waveguide and the wire waveguide (i.e. the guided mode). The result demonstrated that, if the entire surface of the wire waveguide is in contact with air, two different modes exist within the wire waveguide. In other words, two modes of light are simultaneously guided by the same waveguide. This means that the guided mode is the multimode in which two wave numbers of light can exist for a single frequency. The two modes of light propagate at different speeds. Such a multimode propagation may cause some problems in optical communications.

In contrast, if, as shown in FIG. 3, a clad member 15 made of a material having a refractive index lower than that of the wire waveguide and higher than that of air is located on one side of the wire waveguide 14, then the guided mode of the wire waveguide will be the single mode (as shown in FIG. 4), which allows only a single wave number of light for one frequency, so that the above-described problem never arises.

In summary, for a two-dimensional photonic crystal having a wire waveguide, it is preferable for the slab of the two-dimensional photonic crystal to be in contact with air (and, accordingly, out of contact with the clad member) on both the upper and lower sides, whereas the wire waveguide should be preferably in contact with the clad member.

Patent Document 1 discloses a method for manufacturing a substrate-less photonic crystal (having no wire waveguide). The method uses a substrate consisting of an InP or Si layer (called the "slab layer" hereinafter) located on an InGaAsP or SiO$_2$ layer (called the "clad layer" hereinafter). First, a two-dimensional photonic crystal is created by cyclically forming holes penetrating through the slab layer. In this process, a point-like defect and an in-crystal waveguide are also created by appropriately setting the diameter or arrangement of the holes. Next, an etchant is introduced into the completed holes to etch the clad layer located under the holes. By maintaining the etching process for a specific period of time or longer, it is possible to further etch the clad layer located between the holes and thereby form a single space (i.e. the air-bridge space) under the entire area of the two-dimensional photonic crystal where the holes are located. The two-dimensional photonic crystal thus manufactured has a bridge-like structure (i.e. the air-bridge structure) including the slab of the two-dimensional photonic crystal formed like a bridge over the air-bridge space.

One of the most natural methods for integrally manufacturing the two-dimensional photonic crystal and the wire waveguide, is to simultaneously form the patterns of the two-dimensional photonic crystal and the wire waveguide on the slab layer and then create the two-dimensional photonic crystal having the wire waveguide by an etching process or other techniques at one time. However, if the etching is performed to create an air-bridge space under the two-dimensional photonic crystal section of the two-dimensional photonic crystal having the wire waveguide manufactured as described above, the problem arises that the etchant infiltrates into the clad layer through the vicinity of the wire waveguide and etches the clad layer under the wire waveguide as well as under the two-dimensional photonic crystal. As a result, the wire waveguide will be out of contact with the clad layer, thus causing the multimode propagation. Furthermore, due to the lack of strength, the wire waveguide may be broken. Putting a protective mask around the wire waveguide cannot perfectly prevent the infiltration of the etchant through the gap between the wire waveguide and the mask; a portion of the clad layer under the wire waveguide will be etched.

In addition, a discrepancy may occur between the wire waveguide and the extension line of the in-crystal waveguide, which will deteriorate the light-guiding efficiency between the in-crystal waveguide and the wire waveguide. Therefore, while manufacturing a two-dimensional photonic crystal having a wire waveguide, it is necessary for the in-crystal waveguide and the wire waveguide to be least dislocated from the predetermined position.

DISCLOSURE OF THE INVENTION

Problems to be Solved by the Invention

Thus, the clad member (or the substrate) affects the strength and the characteristics of the two-dimensional photonic crystal, the resonator (i.e. the point-like defect) formed in the crystal and the wire waveguide connected to the crystal. Therefore, it is necessary to consider where the clad member should be formed within the two-dimensional photonic crystal. It is also necessary to consider the method for manufacturing the two-dimensional photonic crystal to form the clad member at appropriate positions within the two-dimensional photonic crystal.

The first problem to be addressed by the present invention is to provide a two-dimensional photonic crystal that is higher in mechanical strength and more efficient as a resonator than conventional two-dimensional photonic crystals, and to provide an appropriate method for manufacturing such a two-dimensional photonic crystal.

The second problem to be addressed by the present invention is to provide a method for manufacturing a two-dimensional photonic crystal having a wire waveguide in which the slab of the two-dimensional photonic crystal is in contact with air on both the upper and lower sides whereas the wire waveguide connected to the two-dimensional photonic crystal is supported by a clad member. Particularly, the present invention intends to provide a manufacturing method free from positional discrepancy between the in-crystal waveguide and the wire waveguide of the two-dimensional photonic crystal.

Means for Solving the Problems

To solve the first problem, the present invention provides a two-dimensional photonic crystal having an air-bridge structure, which is characterized in that it includes:

a) a slab-shaped body;

b) a clad layer located under the body;

c) a plurality of modified refractive areas arranged in the body in a lattice pattern with a predetermined cycle and having a refractive index different from that of the body;

d) a point-like defect in the modified refractive index areas; and e) a space formed within the clad layer over a predetermined range and facing the point-like defect.

Also, to solve the first problem, the first mode of the method for manufacturing a two-dimensional photonic crystal having an air-bridge structure according to the present invention is characterized in that it includes:

a) a hole formation process for providing a plate member having a slab layer laminated on a clad layer with etchant introduction hole penetrating the slab layer;

b) an air-bridge formation process for forming a space within the clad layer by introducing an etchant into the etchant introduction hole to etch the clad layer around the etchant introduction hole; and c) a two-dimensional photonic crystal formation process for cyclically forming holes, each hole created by removing the slab layer by a predetermined size, and for forming a point-like defect of the holes in the slab layer and facing the aforementioned space.

To solve the second problem, the second mode of the method for manufacturing a two-dimensional photonic crystal having an air-bridge structure according to the present invention is characterized in that it includes:

a) a two-dimensional photonic crystal formation process for providing a plate member having a slab layer laminated on a clad layer with holes cyclically formed over a predetermined range of the slab layer, and for forming an in-crystal waveguide within the aforementioned range;

b) an air-bridge formation process for forming a space within the clad layer by introducing an etchant into the holes to etch the clad layer under the aforementioned range; and c) a wire waveguide formation process for forming a wire waveguide by removing the slab layer while leaving a predetermined width of the slab layer extending from an edge of the aforementioned range outwards along the extension of the in-crystal waveguide.

Also, to solve the second problem, the third mode of the method for manufacturing a two-dimensional photonic crystal having an air-bridge structure according to the present invention is characterized in that it includes:

a) a hole formation process for providing a plate member having a slab layer laminated on a clad layer with etchant introduction hole formed in the slab layer;

b) an air-bridge formation process for forming a space within the clad layer by introducing an etchant into the etchant introduction hole to etch the clad layer around the etchant introduction hole; and c) a wire-waveguide and two-dimensional photonic crystal formation process for creating a two-dimensional photonic crystal by cyclically forming holes in the slab layer facing the aforementioned space and an in-crystal waveguide extending from an edge of the area provided with the holes inwards, and for forming a wire waveguide by removing the slab layer while leaving a predetermined width of the slab layer extending from an outer edge of the area having the holes outwards along the extension of the in-crystal waveguide.

MODES FOR CARRYING OUT THE INVENTION AND THEIR EFFECTS (1) Two-dimensional Photonic Crystal for Solving the First Problem In the two-dimensional photonic crystal according to the present invention, the body consists of a slab, which is a plate member whose thickness is much smaller than its in-plane sizes. A clad (or substrate) layer is formed on the lower surface the body. The clad layer is intended to enhance the strength of the two-dimensional photonic crystal. In this specification, the surface of the body on which the clad layer is formed is called the "lower surface." However, the two-dimensional photonic crystal according to the present invention can be used with the clad layer directed to any direction; it is not mandatory for the clad layer to be literally on the lower side.

In the body, plural areas (i.e. modified refractive index areas) having a refractive index different from that of the body are arranged in a lattice pattern with a predetermined cycle. As a result, the body becomes a two-dimensional photonic crystal having a photonic bandgap that prevents rays of light included in a specific wavelength band determined by the aforementioned cycle from passing through the body in its in-plane directions. Having the above-described structure, the present two-dimensional photonic crystal prevents the leakage of light between the body and the outside (i.e. the air) by the total reflection due to the difference in the refractive index between the body and the outside. The lattice for arranging the modified refractive index area may be a triangular lattice, a square lattice or any other lattice pattern. The refractive index of the modified refractive index areas may be higher or lower than that of the body. Preferably, the modified refractive index areas should be holes cyclically bored in the body. Using holes as the modified refractive index areas is advantageous for the following points: the difference in the refractive index between the holes and the body is large; the formation of the modified refractive index areas during the manufacturing process will be easier; and the manufacturing method according to the first mode to be described later can be easily applied.

Then, a point-like region as defect of the modified refractive index area is formed to create a point-like defect. The point-like defect may consist of a modified refractive index area whose size differs from that of the other or a region devoid of the modified refractive index area. The defect may be created at a single piece of refractive index area or multiple pieces located adjacent to each other. If the defect is created at each of the multiple pieces of refractive index areas located adjacent to each other, the multiple defects integrally function as a single point-like defect. The point-like defect functions as an optical resonator, which resonates with light having a wavelength determined by the shape of the point-like defect. There may be more than one point-like defect. Creating multiple point-like defects having different shapes will enable each point-like defect to resonate with a different wavelength of light.

A space facing the point-like defect is formed within the clad layer over a predetermined range. The space may be formed to cover the lower side of only the point-like defect, or it may cover a larger range extending across a specific length from the outer edge of the point-like defect. Outside this space, the clad layer supports the body. In the case of creating multiple point-like defects, the space may be separately formed for each point-like defect. Alternatively, a single space facing all the point-like defects may be created. This construction includes an air-bridge structure having the body formed like a bridge over the aforementioned space. The space thus constructed is called the "air-bridge space", as explained earlier.

The presence of the air-bridge space facing the point-like defect enables the point-like defect to function as an optical resonator whose performance is higher than that of a substrate-attached photonic crystal and as high as that of a substrate-less photonic crystal. The reason is as follows: At the point-like defect, air is present on both the upper and lower sides of the body, so that the difference in the refractive index between the body and the outside is large even on the side where the clad layer is located. This yields a high level of light-confining effect. The presence of the air on both sides of the point-like defect makes the parameters of the characteristics of the point-like defect symmetrical between the upper and lower sides at the position concerned. As a result, the light present in the resonator contains only the transverse electric (TE) wave. Thus, the light existing in the resonator is prevented from leaking in in-plane directions of the crystal due to the effect of the photonic bandgap.

The two-dimensional photonic crystal according to the present invention has an adequate mechanical strength because the clad layer supports it outside the range where the air-bridge space is formed. This construction is particularly advantageous if the modified refractive index areas consist of holes, the presence of which lowers the mechanical strength of the crystal.

This paragraph focuses on the size of the air-bridge space. Forming the air-bridge space only under the point-like defect makes the performance of the optical resonator higher than in the case of the substrate-attached photonic crystal described earlier. However, it is more preferable to make the air-bridge space larger so that it includes not only the point-like defect but also one or more cycles of the modified refractive index areas surrounding the point-like defects. Such an enlargement of the air-bridge space will make the optical resonator as high in performance as the substrate-less photonic crystal described earlier. To make the crystal adequately strong, however, the range covered by the air-bridge space should not exceed a certain area. This area depends on the thickness of the body, the size and the material of the modified refractive index areas and other factors. Usually, it should be preferably equal to or smaller than 25 cycles of the modified refractive index areas from the outer edge of the point-like defect at least in one direction within the plane of the body. Making the range equal to or smaller than 25 cycles only in one direction will produce a supporting strength in that direction, thereby allowing the sizes in the other directions to be larger than 25 cycles while maintaining the strength of the crystal. With respect to the depth of the air-bridge space, even the slightest depth will make the performance of the optical resonator higher than in the case of the substrate-attached photonic crystal described earlier. More preferably, however, the depth should be equal to or larger than two cycles of the modified refractive index areas in order to fully eliminate the leakage of light into the clad layer or the influence of the asymmetry in the vertical direction.

The two-dimensional photonic crystal according to the present invention can be used as a multiplexer/demultiplexer by adding another waveguide in proximity to the point-like defect. This waveguide can be formed by creating a linear defect of the modified refractive index areas. Particularly, it is preferable to form the waveguide by creating a linear defect in the modified refractive index areas, or by omitting the modified refractive index areas. With this construction, the crystal functions as a multiplexer/demultiplexer for extracting light having the resonance wavelength from the superimposed light having multiple wavelengths and propagating through the waveguide, and emitting the extracted light to the outside of the crystal, or for introducing light having the resonance wavelength from the outside of the crystal into the superimposed light propagating through the waveguide.

Suppose a section of the aforementioned waveguide faces the air-bridge space. In this case, if the width of the waveguide in the section facing the air-bridge space equals the width in the other section, the transmission wavelength band of the "air-bridge waveguide section" shifts from the transmission wavelength band of the other section ("substrate waveguide section") toward the short wavelength side. Then, the transmission wavelength band of the entire waveguide, which consists of the common segment of the transmission wavelength bands of the aforementioned two sections, becomes narrower than in the case where there is no air-bridge waveguide section. Therefore, the width of the waveguide should be preferably larger in the air-bridge waveguide section than in the substrate waveguide section by a predetermined size. This construction produces a shift of the transmission wavelength band of the air-bridge waveguide section toward the long wavelength side and thereby prevents the common transmission wavelength band from being narrower.

However, due to some limitations on the production of two-dimensional photonic crystals or other factors, the widened portion of the waveguide may be dislocated from the section where the waveguide faces the air-bridge space, leaving an area including a narrowed portion of the waveguide located within the air-bridge waveguide section and another area including a widened portion of the waveguide located within the substrate waveguide section. If an area including a narrower portion of the waveguide is present within the air-bridge waveguide section, the waveguide transmission band of the area remains on the short wavelength side, preventing the transmission wavelength band of the entire waveguide from being broader. In contrast, if an area including a widened portion of the waveguide is present within the substrate waveguide section, the waveguide transmission band of the area is shifted toward the long wavelength side, making narrower the common transmission wavelength band on the short wavelength side. On the short wavelength side, the light can be propagated even within a range outside the common transmission wavelength band if the light contains both TE and TM waves, though the TM wave leaks to some extent within the waveguide. If the area including the wider portion of the waveguide within the substrate waveguide section is smaller than several cycles of the modified refractive index areas, the leakage of the TM wave can be suppressed to prevent any practical problem, so that a broad common transmission wavelength band can be efficiently used. Therefore, the waveguide may be designed to be a predetermined amount wider within a section extending to a point located at a predetermined distance from the air-bridge waveguide section, than within the other range. This design prevents the common transmission wavelength band of the waveguide from being narrower even if the position where the width of the waveguide changes is dislocated during the manufacturing process.

(2) Manufacturing Method: First Mode

The first mode of the method for manufacturing a two-dimensional photonic crystal according to the present invention is described. The present manufacturing method relates to the production of the above-described photonic crystal according to the present invention, i.e. a two-dimensional photonic crystal having an air-bridge space facing a point-like defect. Particularly, it can be preferably used to produce a two-dimensional photonic crystal having holes as the modified refractive index areas.

The present mode of manufacturing method uses a plate member having a slab (or body) layer laminated on a clad (or substrate) layer. The two-dimensional photonic crystal is formed in the slab layer, and the air-bridge space is formed in the clad layer. An example of the plate member is a substrate in which the slab layer is made of Si and at least the portion of the clad layer where the air-bridge space is to be formed is made of $SiO_2$. A more specific example is a commercial SOI (silicon on insulator) substrate manufactured by forming a thin film of SiO$_2$ on a thick film of Si and then laminating a thin film of Si on the SiO$_2$ thin film. If an SOI substrate is used, the Si thin film becomes the slab layer, and the combination of the SiO$_2$ thin film and the Si thick film becomes the clad layer. The air-bridge space should be formed in the SiO$_2$ thin film of the clad layer.

First, a hole or holes are formed in the slab layer of the plate member (the hole formation process). The hole is called the "etchant introduction hole" in this specification. The etchant introduction hole will constitute a portion of the modified refractive index areas after the completion of the two-dimensional photonic crystal. The hole formation process does not create all the modified refractive index areas; it creates holes only in a limited portion of the slab layer. A photolithographic or an electron-beam (EB) writing process, followed by an etching process, can be used to create the etchant introduction hole.

Next, an etchant is introduced through the etchant introduction hole into the clad layer. The etchant introduced through the etchant introduction hole infiltrates into the clad layer and etches it. Thus, the clad layer located around the etchant introduction hole is removed, so that an air-bridge space is formed at the location (the air-bridge space formation process). Generally known etching liquids or etching gases can be used as the etchant. For example, an aqueous solution of hydrogen flouride can be used for a clad layer of SiO$_2$.

After the etching process is finished, holes are cyclically formed in the slab layer, each hole being formed by removing the slab layer by a predetermined size. This process creates all the modified refractive index areas. Simultaneously, a point-like defect facing the air-bridge space is formed in the slab layer. The point-like defect can be created by, for example, forming a hole having a diameter different from that of the other holes or by omitting a hole or holes. By these manufacturing steps, a two-dimensional photonic crystal is formed in the slab layer (the two-dimensional photonic crystal formation process). As described in Patent Document 1, a photolithographic or electron-beam writing process, followed by an etching process, can be used to create the holes and the point-like defect. Thus, a two-dimensional photonic crystal having an air-bridge space formed under a point-like defect is manufactured.

As in the case of using the resultant crystal as a two-dimensional photonic crystal multiplexer/demultiplexer, if the two-dimensional photonic crystal according to the present invention needs to have an in-crystal waveguide, a linear defect of the holes may be formed in the two-dimensional photonic crystal formation process. If a portion of the waveguide faces the air-bridge space, it is preferable to form the waveguide so that its width is larger in that portion (i.e. the air-bridge waveguide section) than that in the other portion, as described earlier. Furthermore, the waveguide may be preferably designed to be a predetermined amount wider within a section extending to a point located at a predetermined distance from the air-bridge waveguide section, than within the other range, so as to prevent the common transmission wavelength band of the waveguide from being narrower even if the position where the width of the waveguide changes is dislocated during the manufacturing process.

The first mode of the manufacturing method according to the present invention enables a two-dimensional photonic crystal having an air-bridge structure to be manufactured easily and at low cost by techniques generally known in the production of semiconductor devices.

(3) Manufacturing Method: Second Mode

The second mode of the manufacturing method relates to the production of a two-dimensional photonic crystal having a wire waveguide and an air-bridge structure. This mode also uses a plate member (e.g. an SOI substrate) consisting of a slab (or body) layer laminated on a clad (or substrate) layer, as in the first mode.

First, holes are cyclically formed in the slab layer over a predetermined range. With a cyclic distribution of refractive index thus created, the aforementioned range having the holes becomes a two-dimensional photonic crystal. In this process, an in-crystal waveguide is also formed. In general, an in-crystal waveguide is created by linearly disordering the cyclic array of the holes. Typically, it is created by forming a linear zone devoid of the holes. Otherwise, an adequately effective in-crystal waveguide can be obtained by narrowing or widening the space between the holes arranged on both sides of the waveguide. Naturally, the in-crystal waveguide may be formed by creating a linear arrangement of holes having a diameter different from that of the other neighboring holes or by embedding a different material. The holes are created by photolithography, electron-beam lithography, dry etching or other techniques generally used in the production of semiconductor devices. The two-dimensional photonic crystal may be provided with a point-like defect according to necessity. The wire waveguide is not formed at this stage.

Next, an etchant is introduced through the holes into the clad layer. The etchant introduced through the holes infiltrates into the clad layer and etches it under and around the holes. Thus, an air-bridge space is formed under the range where the holes are located, i.e. under the two-dimensional photonic crystal. In this process, it is possible to make the area of the air-bridge space approximately coincide with the area of the two-dimensional photonic crystal by regulating the etching time. The area of the air-bridge space does not need to perfectly coincide with the area of the two-dimensional photonic crystal; it may be somewhat larger or smaller. Generally known etching liquids or etching gases can be used as the etchant. For example, an aqueous solution of hydrogen fluoride can be used for a clad layer made of SiO$_2$.

Subsequently, a wire waveguide is formed along the extension of the in-crystal waveguide from the outer edge of the aforementioned range (i.e. the two-dimensional photonic crystal) outwards. Namely, the slab layer located in the vicinity of the wire waveguide is removed so that the slab layer is left by the width of the wire waveguide. The lower side of the wire waveguide thus formed is in contact with the clad layer, which still remains outside the air-bridge space. For the removal of the slab layer, the photolithography, electron-beam lithography, dry etching or other techniques can be used, as in the case of the formation of the holes. In this process, it is recommendable to use the overlapping function of commercial lithography devices so that the wire waveguide to be formed will be correctly positioned on the extension of the in-crystal waveguide created earlier. The overlapping function is generally used in the semiconductor manufacturing industry; when a new pattern is to be formed in accordance with another pattern created previously, the overlapping function is used to make the positional discrepancy between the two patterns smaller than predetermined.

In removing the slab layer during the wire waveguide formation process, it is not necessary to entirely remove the slab layer except for the wire waveguide; it is acceptable to partially remove the slab layer so as to form a groove on each side of the wire waveguide. For example, in the case of removing the slab layer by electron beam lithography, it is easier to remove the slab layer only in the groove portion than to remove it over a large area.

The width of the groove should be equal to or larger than one cycle of the hole arrangement, as explained later. The "one cycle of the hole arrangement" in the present invention means the distance between the two closest holes.

FIG. 5 shows the distribution of the electric field of light propagating through the wire waveguide with respect to the width direction of the wire waveguide. The abscissa indicates the position in the width direction of the wire waveguide. Numeral 21 denotes the range corresponding to the area of the wire waveguide. The ordinate indicates the amplitude of the electric field. A larger absolute value on the ordinate indicates a stronger electric field. The electric field also exists outside the wire waveguide 21. This electric field, however, approximately vanishes at point 22, whose distance from the end of the wire waveguide equals a, i.e. one cycle of the hole arrangement. Therefore, the light will barely leak from the wire waveguide into the neighboring slab layer if the width of the groove equals one cycle of the hole arrangement or larger.

When a ray of light propagates through the two-dimensional photonic crystal, a portion of the light leaks from the in-crystal waveguide to some extent in the width direction of the waveguide (this leakage does not cause any loss of light from the in-crystal waveguide because the light will not spread beyond the aforementioned extent). The range of the leakage is approximately five cycles of the hole arrangement. If the slab layer remaining at an outer position from the grooves on both sides of the wire waveguide is directly connected to the two-dimensional photonic crystal, the light leaking from the in-crystal waveguide will infiltrate into the remaining slab layer, thus causing the loss of light. Therefore, the wire waveguide formation process may preferably include an additional step for removing the slab layer along the outer edge of the two-dimensional photonic crystal from the wire waveguide over a length equal to or longer than five cycles of the hole arrangement. This construction prevents the light leaking from the in-crystal waveguide from entering the slab layer left outside the groove and being lost there.

The second mode of the manufacturing method according to the present invention yields the following effects: According to the present invention, the air-bridge space is formed under the two-dimensional photonic crystal created earlier, after which the wire waveguide is formed from the outer edge of the two-dimensional photonic crystal outwards. Therefore, the lower side of the wire waveguide securely comes in contact with the clad layer. The guided mode of the wire waveguide thus manufactured is the single mode, which will never cause any problem associated with the multimode. Also, since the air-bridge space is present under the two-dimensional photonic crystal, the light present within the two-dimensional photonic crystal is confined in the direction perpendicular to the slab, due to the difference in the refractive index between the slab and the air existing on its upper and lower sides. Thus, the loss of light is minimized.

(4) Manufacturing Method: Third Mode

The third mode of the manufacturing method relates to the production of a two-dimensional photonic crystal having a wire waveguide and an air-bridge structure, similar to the second mode. The present mode also uses a plate member (e.g. an SOI substrate) consisting of a slab (or body) layer laminated on a clad (or substrate) layer.

First, a hole or holes penetrating through the slab layer are formed. The hole is to be used for introducing an etchant into the clad layer, as opposed to the second mode where the holes are intended for making the modified refractive index areas of the two-dimensional photonic crystal. The hole formed hereby is called the "etchant introduction hole" hereinafter. As explained later, the etchant introduction hole should be preferably formed outside the area where a two-dimensional photonic crystal having a wire waveguide is to be located after the completion. More preferably, they should be arranged in parallel on both sides of the in-crystal waveguide and at a predetermined distance from the same waveguide. However, it is also possible to form the etchant introduction hole as a portion of the holes that are to be the modified refractive index areas. The etchant introduction hole is created by photolithography, electron-beam lithography, dry etching or other techniques.

Next, an etchant is introduced through the etchant introduction hole into the clad layer. The etchant introduced through the holes infiltrates into the clad layer and etches it under and around the holes. Thus, an air-bridge space is formed over a certain range from the holes. As in the second mode, generally known etching liquids or etching gases can be used as the etchant.

Subsequently, holes are cyclically formed in the slab layer facing the air-bridge space (i.e. in the slab layer located over the air-bridge space). With a cyclic distribution of refractive index thus created, the area where the holes are located becomes a two-dimensional photonic crystal. The area where the holes are located does not need to perfectly coincide with the area of the air-bridge space; it may be somewhat larger or smaller. In the process of creating the holes, the in-crystal waveguide is simultaneously formed. One or both ends of the in-crystal waveguide should reach the outer edge of the area where the holes are located. In general, an in-crystal waveguide is created by linearly disordering the cyclic array of the holes. Typically, it is created by forming a linear zone devoid of the holes. Otherwise, an adequately effective in-crystal waveguide can be obtained by narrowing or widening the space between the holes arranged on both sides of the waveguide. Naturally, the in-crystal waveguide may be formed by creating a linear arrangement of holes having a diameter different from that of the other neighboring holes or by embedding a different material. The two-dimensional photonic crystal may be provided with a point-like defect according to necessity. The point-like defect can be created by, for example, forming a row of holes having a diameter different from that of the other holes cyclically arranged or by linearly eliminating the holes. The photolithography, electron-beam lithography, dry etching or other techniques can be used to form the holes in this process, similar to the etchant introduction hole.

While the two-dimensional photonic crystal is being formed as described above, a wire waveguide is also formed from an end of the in-crystal waveguide towards the outside of the air-bridge space. The wire waveguide is created by removing the slab layer located in the vicinity of the wire waveguide while leaving the slab layer by the width of the wire waveguide. The lower side of the wire waveguide thus formed is in contact with the clad layer, which still remains outside the air-bridge space. For the removal of the slab layer, the photolithography, electron-beam lithography, dry etching or other techniques can be used, as in the case of the formation of the holes.

In the case of creating the two-dimensional photonic crystal and the wire waveguide by separate processes, either the in-crystal waveguide or the wire waveguide is formed by one process, which is followed by the other process where the second waveguide is formed so that it coincides with the first waveguide formed earlier. In the latter process, it is necessary to adjust the positions of the two waveguides. In the third mode of the manufacturing method, on the other hand, the two-dimensional photonic crystal and the wire waveguide are simultaneously formed in the same process (the wire waveguide and two-dimensional photonic crystal formation process). This is advantageous in that the positioning work can be omitted to save time and labor, and in that the two waveguides can be securely adjusted to the correct position.

The etchant introduction hole should be preferably formed outside the area where the two-dimensional photonic crystal having the wire waveguide is to be located after the completion. This construction enables the etchant introduction hole or the etched air-bridge space to be formed in a relatively rough pattern, thus simplifying the manufacturing process. Alternatively, it is also possible to form the etchant introduction hole within the area of the two-dimensional photonic crystal having the wire waveguide so as to use these holes as a portion of the holes or a point-like defect inside the two-dimensional photonic crystal to be formed later, or for some other purposes. In this case, however, it is necessary to adjust the position of the etchant introduction hole and the pattern of two-dimensional photonic crystal in the process of forming a two-dimensional photonic crystal having a wire waveguide.

The etchant introduction holes should be arranged substantially in parallel on both sides of the in-crystal waveguide and at a predetermined distance from the same waveguide.

If only one etchant introduction hole is formed, the outer edge of the air-bridge space will be circular. If plural etchant introduction holes are formed along a line, the clad layer will be etched by the same distance from each hole. Then, the outer edge of the resulting air-bridge space will be like a belt extending parallel to the row of the etchant introduction holes, with each end of the belt shaped like an arc centering on the hole located at each end. If an end of the in-crystal waveguide is located at the arc-shaped edge, then a portion of the two-dimensional photonic crystal will be out of contact with the air-bridge space because the air-bridge space is not present in the width direction of the waveguide from the arc-shaped edge.

In contrast, if the etchant introduction holes are arranged substantially in parallel on both sides of the in-crystal waveguide and at a predetermined distance from the same waveguide, the resulting air-bridge space will be the combination of two pieces of the above-described belt-like air-bridge spaces overlapping each other at their longer sides. In this case, the arc-shaped areas of the belt-like air-bridge spaces intersect at each end of the in-crystal waveguide. Therefore, the air-bridge space is present also in the width direction of the in-crystal waveguide from the end of the same waveguide, and the two-dimensional photonic crystal is entirely in contact with the air-bridge space. If a leakage of light occurs as explained earlier, the light will not be lost into the clad layer.

As in the case of the second mode, the following statement also applies to the third mode: In the wire waveguide formation process, the slab layer has only to be removed so as to form a groove on each side of the wire waveguide (there is no need to remove all the slab layers except for the portion corresponding to the wire waveguide), and the width of the groove should be one cycle of the hole arrangement or larger. Also, in the wire waveguide formation process, it is preferable to remove the slab layer along the outer edge of the two-dimensional photonic crystal from the wire waveguide over a length equal to or longer than five cycles of the hole arrangement, as in the case of the second mode.

The third mode of the manufacturing method according to the present invention yields the following effects: According to the present invention, the wire waveguide is formed outside the air-bridge space, which has already been formed. Therefore, the lower side of the wire waveguide securely comes in contact with the clad layer. The guided mode of the wire waveguide thus manufactured is the single mode, which will never cause any problem associated with the multimode. In addition, the two-dimensional photonic crystal is created over the air-bridge space, which has already been formed. Therefore, the lower side of the two-dimensional photonic crystal securely comes in contact with the air-bridge space. The difference in the refractive index between the two-dimensional photonic crystal and the air existing on its upper and lower sides makes it possible to confine the light in the direction perpendicular to the slab and thereby minimize the loss of light. Furthermore, since the in-crystal waveguide and the wire waveguide are formed in the same process, there is no need to adjust the positions of the in-crystal waveguide and the wire waveguide. The wire waveguide will be correctly formed on the extension of the in-crystal waveguide.

BRIEF DESCRIPTION OF THE DRAWINGS

FIG. 1 shows experimentally measured resonance wavelength spectrums of point-like defects formed in a conventional substrate-less photonic crystal (a) and a conventional substrate-attached photonic crystal (b).

FIG. 11 shows an embodiment (Embodiment 2) of the method for manufacturing the two-dimensional photonic crystal of the first mode.

EXPLANATION OF NUMERALS 10, 91 . . . Two-Dimensional Photonic Crystal
11 . . . Slab
12, 35, 45, 51, 62, 72, 85, 96 . . . Hole
13, 63, 73, 87, 94 . . . In-Crystal Waveguide
14, 65, 75, 88, 92 . . . Wire Waveguide
15 . . . . Clad Member
31, 611, 711, 811 . . . Slab Layer
32, 612, 712, 812 . . . Clad Layer
33, 613, 813 . . . Silicon Layer
36, 361, 3621, 3622, 363, 364, 365, 46, 603, 604 . . . Point-Like Defect
37, 371, 372, 373, 374, 375, 376, 44, 49, 52, 54, 64, 74, 83, 93 . . . . Air-Bridge Cavity (Air-Bridge Space)
38, 47. . . Waveguide
41, 61, 81 . . . SOI Substrate
42, 82, 95 . . . Etchant Introduction Hole
43 . . . Aqueous Solution of Hydrogen Fluoride
66, 76, 86, 97 . . . Groove
68, 69, 891, 892 . . . Resist Embodiment 1

Figure 2:
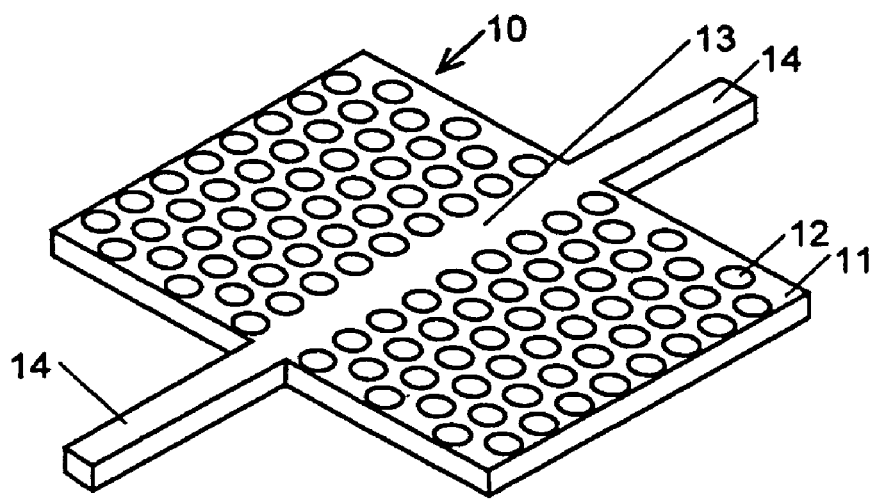
FIG. 2 shows an example of a two-dimensional photonic crystal having a wire waveguide.
Figure 3:
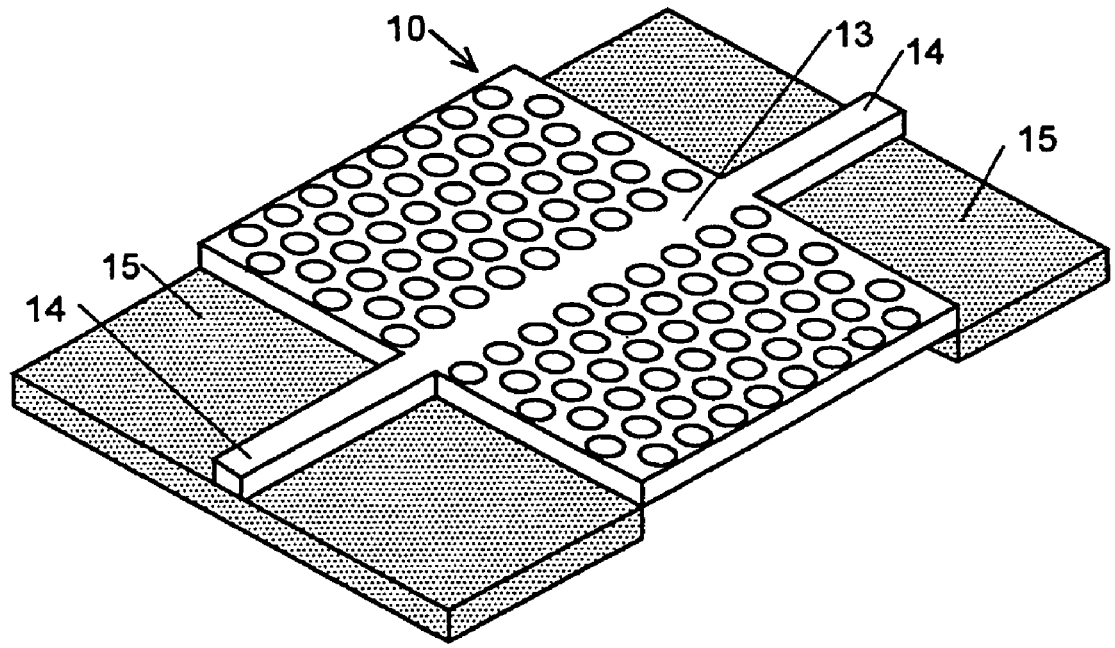
FIG. 3 shows an example of a two-dimensional photonic crystal having a wire waveguide with a clad member.
Figure 4:
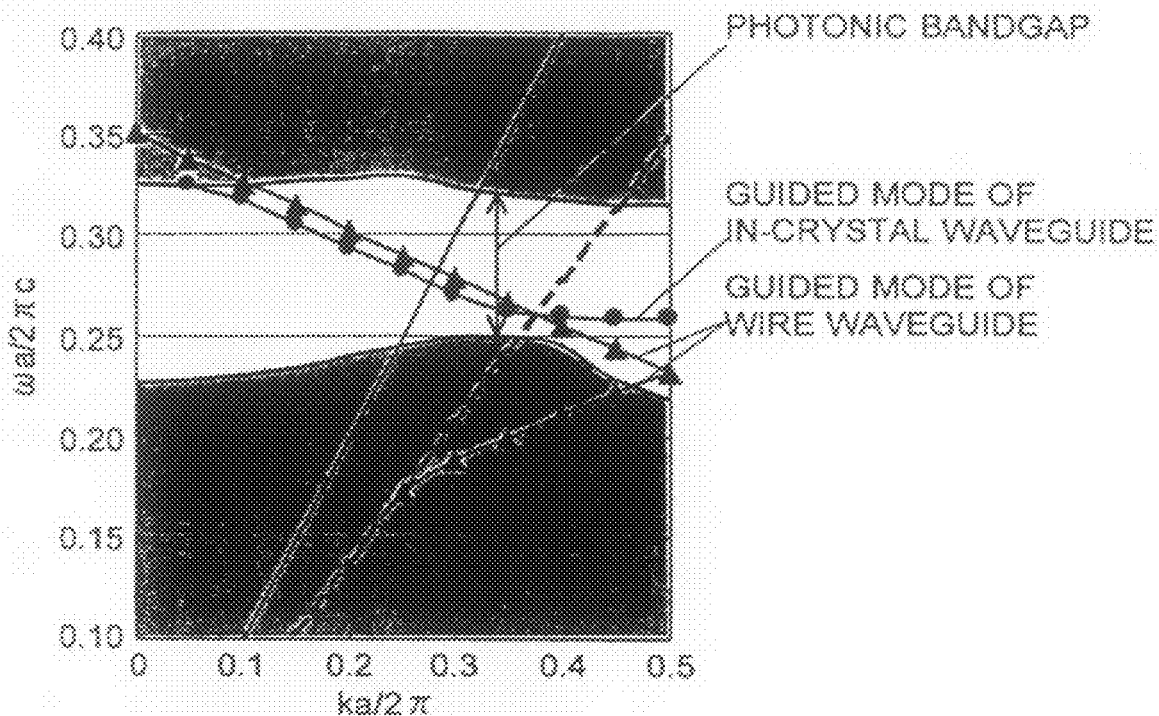
FIG. 4 is a graph showing the guided modes of the wire waveguide with the clad member and the in-crystal waveguide.
Figure 5:
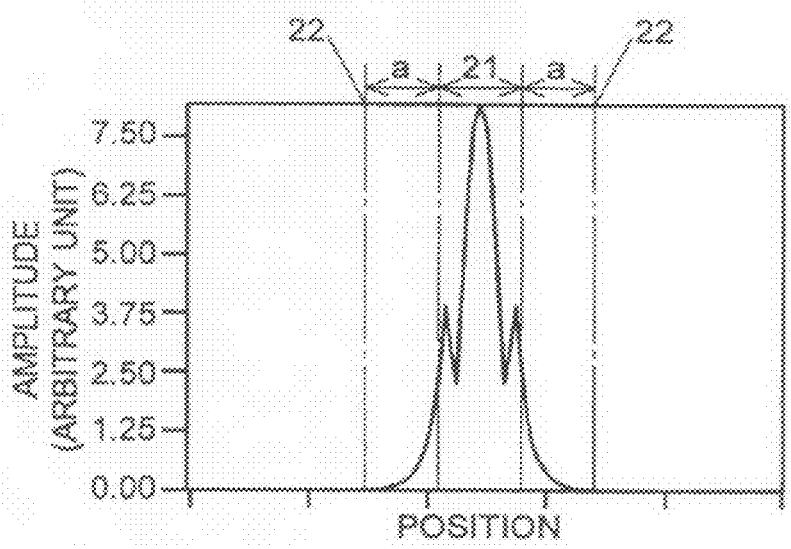
FIG. 5 is a graph showing a distribution of light in the width direction of the wire waveguide.
Figure 6:
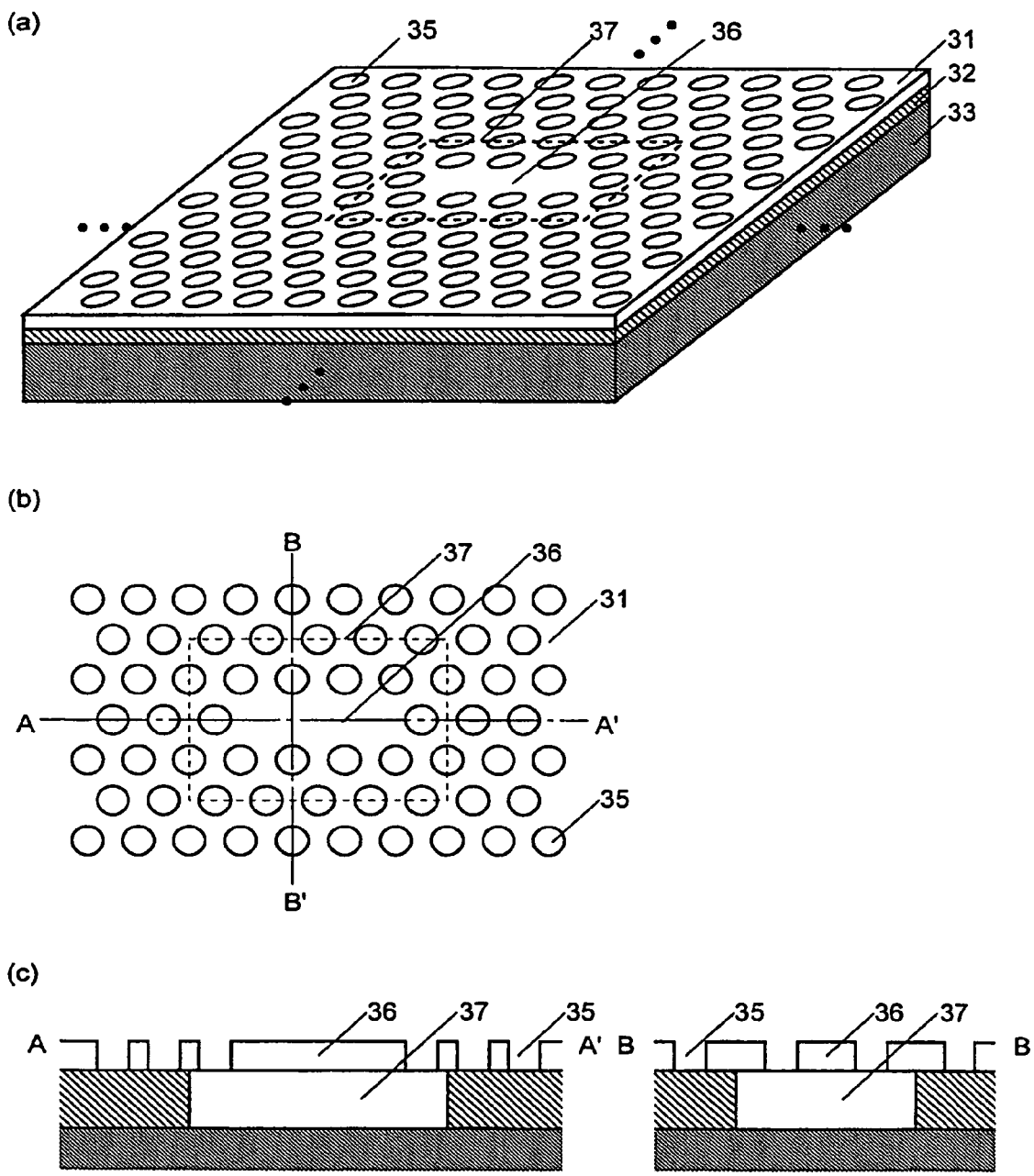
FIG. 6 includes a perspective view, a plan view and sectional views of an embodiment of the two-dimensional photonic crystal having an air-bridge space facing a point-like defect according to the present invention.
Figure 7:
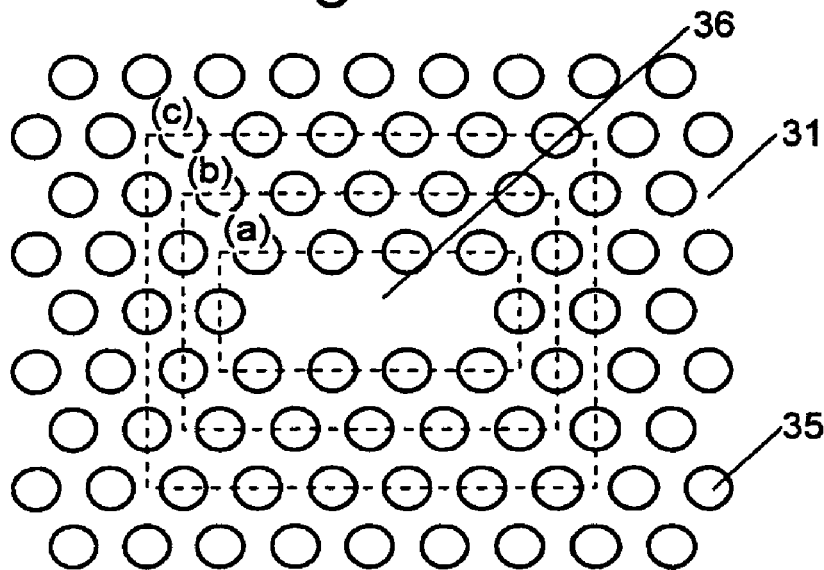
FIG. 7 shows the air-bridge spaces for which the Q-value of a point-like defect was calculated.

FIG. 6 shows an example of the structure of the two-dimensional photonic crystal having an air-bridge space facing a point-like defect, where (a) is a perspective view, (b) is a plan view, and (c) shows the left side cross section at line A-A' in (b) and the right side cross section at line B-B'. This device consists of a slab layer 31 made of silicon (Si), a clad layer 32 made of $SiO_2$, and a silicon layer 33 made of Si. The clad layer 32 combined with the silicon layer 33 supports the slab layer 32.

In the slab layer 31, holes 35 are cyclically arranged in a triangular lattice pattern. This structure has a photonic bandgap and prevents rays of light having wavelengths corresponding to the energy levels within the photonic bandgap from propagating through the body layer. In the present case, the cycle a of the triangular lattice is 0.41 μm. A point-like defect 36 is formed by eliminating three holes 35 along a straight line, or by omitting the three holes. An air-bridge space 37 devoid of $SiO_2$ is formed under the point-like defect 36. The air-bridge space, which is a cavity-like space surrounded by the slab layer 31, the clad layer 32 and the silicon layer 33, is called the "air-bridge cavity" hereinafter. The range over which the air-bridge cavity 37 is to be formed will be specified later.

The contact plane between the slab layer 31 and the clad layer 32 has a certain degree of light-confining capability in the direction perpendicular to the slab layer 31 due to the difference in the refractive index between Si (refractive index~3.5) and $SiO_2$ (refractive index~1.5). The confining effect, however, is unsatisfactory in comparison to the case where the body layer is in contact with air; if $SiO_2$ is present under the point-like defect 36, then light will leak through the point-like defect 36 into the clad layer 32. Furthermore, the vertical directional asymmetry at the point-like defect 36 will lead to the coupling of the transverse electric (TE) wave and the transverse magnetic (TM) wave and thereby causes a leakage of light from the point-like defect 36 into the slab layer 31. Taking these problems into account, the present embodiment has the air-bridge cavity 37 formed under the point-like defect 36 to prevent the leakage of light from the point-like defect 36 into the clad layer 32 and the slab layer 31.

Figure 8:
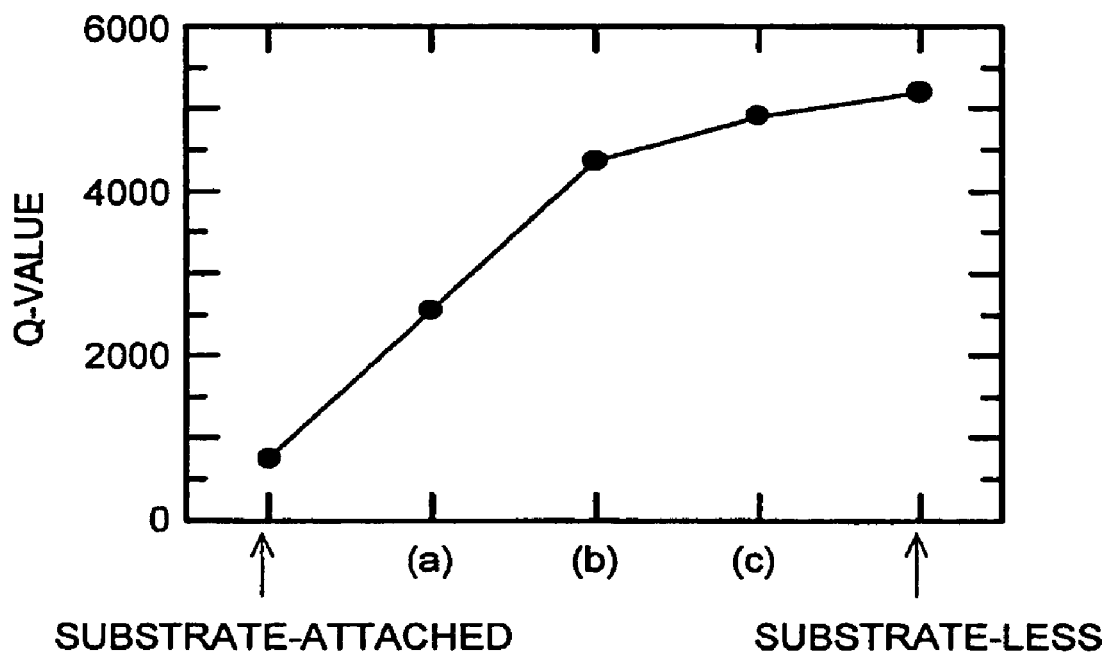
FIG. 8 is a graph showing the result of the calculation of the Q-value of a point-like defect in Embodiment 1.

For the two-dimensional photonic crystal having the structure shown in FIG. 6, a calculation based on the finite difference time domain (FDTD) method has been conducted to determine the Q-value of the point-like defect 36. More specifically, the Q-values were calculated under the following conditions: the air-bridge cavity 37 is formed; (a) under only the point-like defect 36, (b) under the point-like defect 36 and one lattice cycle surrounding it, or (c) under the point-like defect 36 and two lattice cycles surrounding it. The depth of the air-bridge cavity 37 was set at $2a$. For comparison, the Q-value was also calculated for a substrate-less photonic crystal in which slab layer 31 is totally in contact with air on both the upper and lower sides and for a substrate-attached photonic crystal in which the clad layer 32 totally covers the lower surface of the slab layer 31, including the space under the point-like defect 36. FIG. 8 shows the calculation results, where "SUBSTRATE-ATTACHED" denotes the substrate-attached photonic crystal and "SUBSTRATE-LESS" denotes the substrate-less photonic crystal. The figure shows that the Q-values for (b) and (c) are comparable with that of the point-like defect 36 of the substrate-less photonic crystal. Therefore, the air-bridge cavity 37 may be larger than the area shown in (b) as long as the slab layer 31 is adequately strong. The above results prove that the two-dimensional photonic crystal of the present embodiment can be used to produce a point-like defect resonator having a high level of performance.

Figure 9:
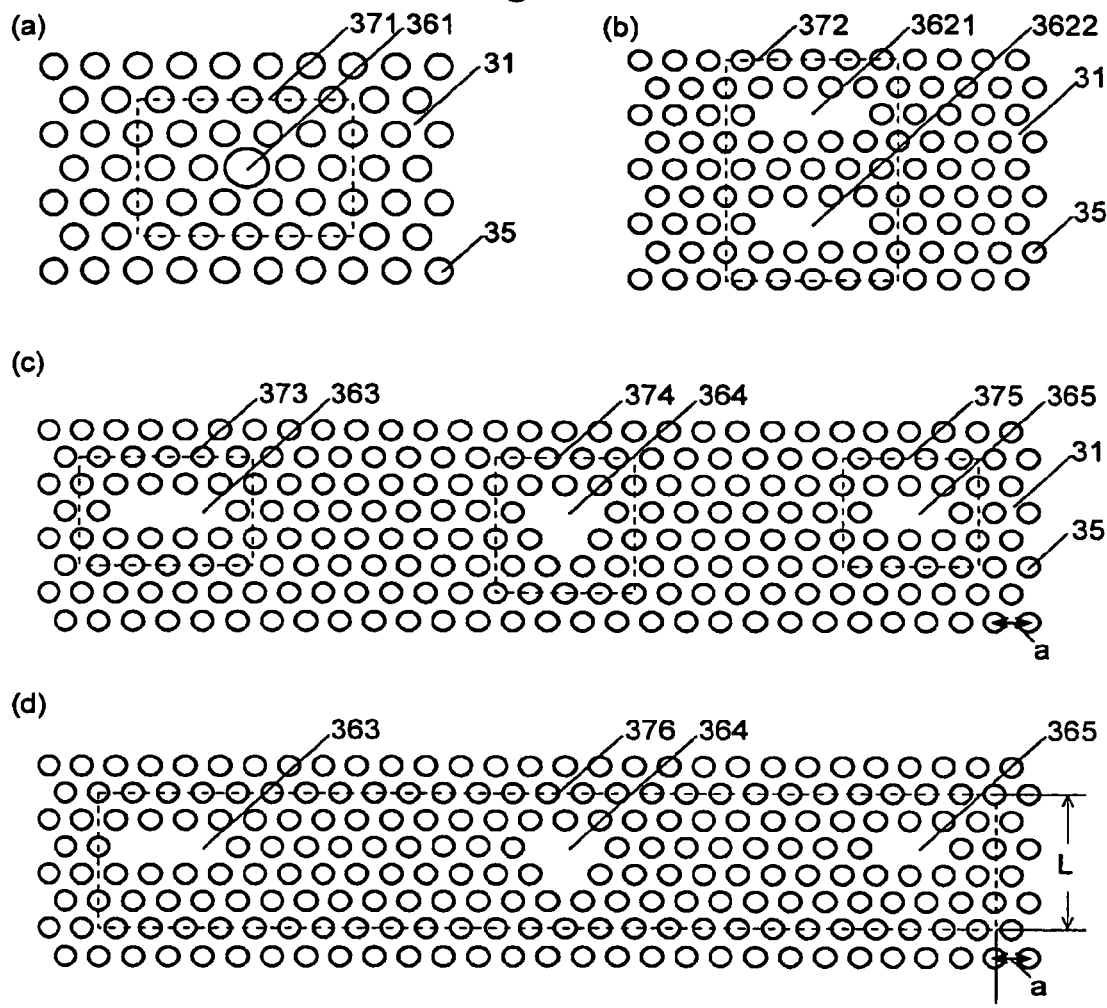
FIG. 9 includes plan views of other examples of point-like defects in Embodiment 1.

In addition to the one shown FIG. 6, the point-like defect of the slab layer 31 can take various forms. FIG. 9 show other examples of the point-like defect. In (a), the diameter of one of the holes 35 is made larger than that of the other to create a point-like defect 361. This type of point-like defect enables easy control of the resonance wavelength through a change in its diameter. In (b), two identical point-like defects are located next to each other, and one air-bridge cavity 372 is formed for the two point-like defects 3621 and 3622. The two defects 3621 and 3622 resonate with the same wavelength of light and integrally function as a single resonator. FIG. 9 shows different types of point-like defects 363-365 arranged in a photonic crystal. Each of the three defects 363-365 resonates with a different wavelength of light. In (c), three air-bridge cavities 373-375 are separately formed for the three point-like defects, respectively. In contrast, the point-like defects 363-365 shown in (d) are commonly included in a single air-bridge cavity 376. Though this air-bridge cavity 376 is larger than any of the air-bridge cavities 373-375, it still has an adequate strength because its in-plane length L is short in the direction perpendicular to the alignment of the point-like defects 363-365.

Figure 10:
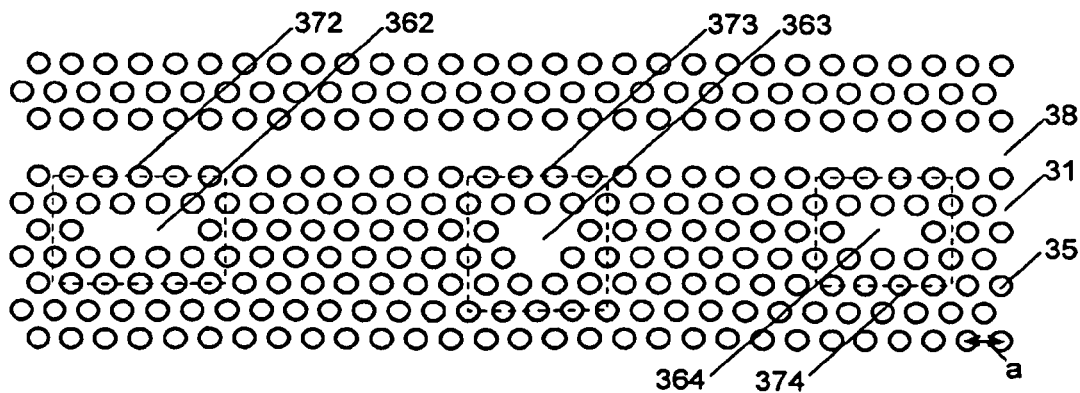
FIG. 10 is a plan view of an example of the waveguide in Embodiment 1.

FIG. 10 shows an example in which a two-dimensional photonic crystal according to the present invention has a waveguide. The waveguide 38 is created by linearly eliminating the holes 35, or by omitting the holes 35. In addition to removing some holes 35 from the triangular lattice points on which the holes 35 are arranged, it is possible to shift a row or rows of the holes 35 and appropriately set the width of the waveguide 38 to regulate the wavelength band within which light can propagate through the waveguide. With the waveguide thus formed in proximity to the point-like defect, the crystal functions as a multiplexer/demultiplexer for extracting light having the resonance wavelength from the superimposed light having multiple wavelengths and propagating through the waveguide and emitting the extracted light to the outside of the crystal, or for introducing light having the resonance wavelength from the outside of the crystal into the superimposed light propagating through the waveguide.

Embodiment 2

An embodiment of the method for manufacturing the two-dimensional photonic crystal of the first mode is described with reference to FIG. 11.

The present method uses an SOI substrate 41 composed of three layers: a slab layer 31 made of Si, a clad layer 32 made of $SiO_2$ and a silicon layer 33 made of Si. Commercial SOI substrates can be used as the SOI substrate 41. First, two etchant introduction holes 42 are bored in the slab layer 31(a). The etchant introduction holes 42 are formed, for example, by the steps of applying an electron beam resist on the slab layer 31, writing images of the etchant introduction holes 42 using an electron beam, and performing a dry etching process using an etching gas (e.g. $SF_6$). Next, the SOI substrate 41 is dipped into an aqueous solution of hydrogen fluoride 43(b). The aqueous solution of hydrogen fluoride entering through the etchant introduction holes 42 etches only the clad layer 32 without affecting the slab layer 31 and the silicon layer 33. The clad layer 32 is etched from the etchant introduction holes 42 across a specific distance. Thus, an air-bridge space 44 is formed. For the same reason as explained earlier, this air-bridge space is called the "air-bridge cavity" hereinafter. Subsequently, other holes 45, which will be the modified refractive index areas later, are formed in a triangular lattice pattern, where a point-like defect 46 devoid of the holes is also formed over the air-bridge cavity 44. In this process, the position of the SOI substrate should be adjusted so that each etchant introduction hole 42 will be one of the modified refractive index areas. The holes 45 are created by electron-beam writing and dry etching techniques, as in the case of the etchant introduction holes 42.

To add a waveguide, the holes 45 located at the lattice points corresponding to the waveguide 47 may be omitted, as shown in (c-2), instead of (c-1).

Figure 12:
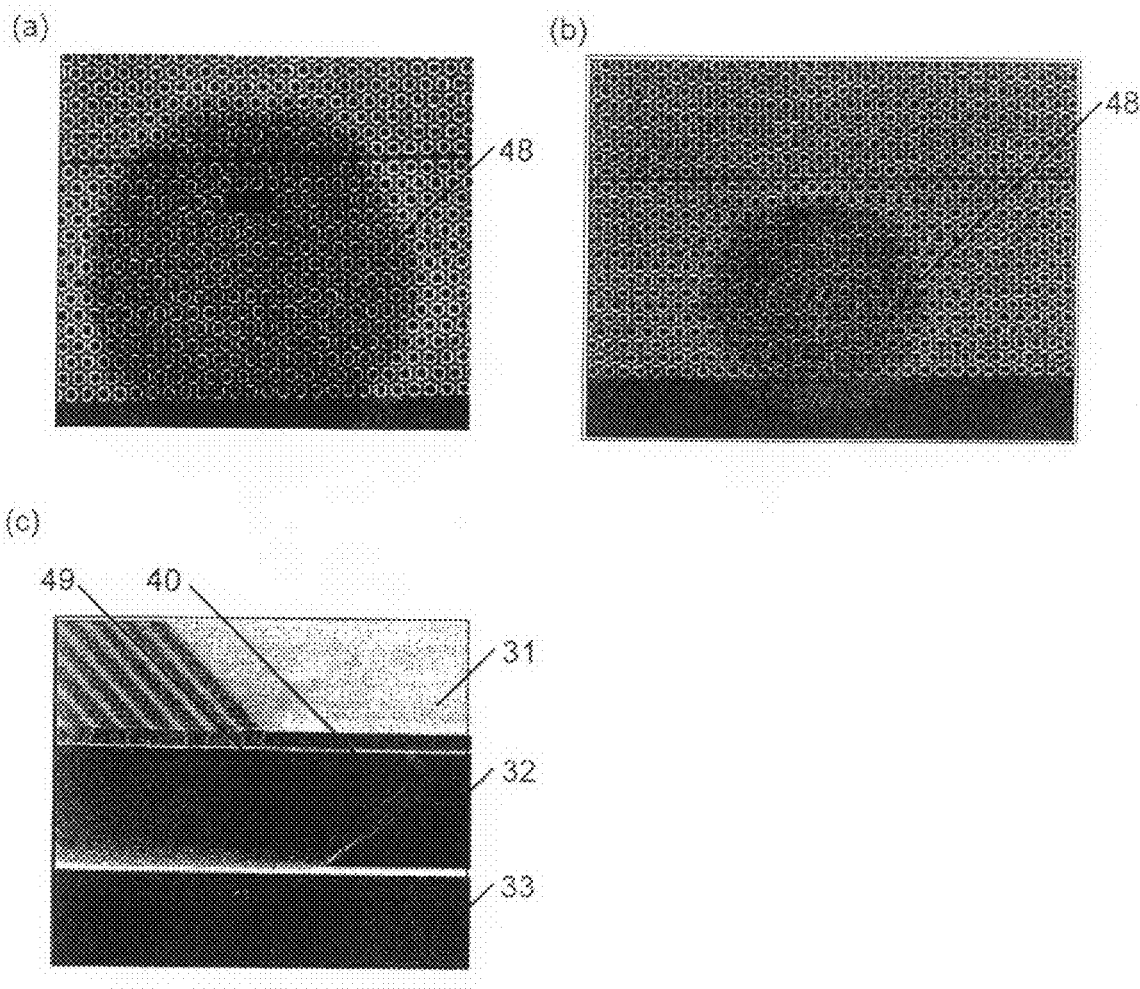
FIG. 12 includes scanning electron microscope (SEM) images of the two-dimensional photonic crystal having an air-bridge structure manufactured in Embodiment 2.

FIG. 12 shows scanning electron microscope (SEM) images of a two-dimensional photonic crystal manufactured according to the second embodiment. (a) and (b) show the top of the slab layer 31 of the two-dimensional photonic crystal. This example includes a point-like defect and a waveguide. The discolored area 48 indicates the region where the air-bridge cavity is formed under the slab layer 31. (c) is an SEM image of a section of the SOI substrate in the vicinity of the boundary of the area 48, obliquely observed from above. It shows that the clad layer 32 has been etched to form an air-bridge cavity 49. The clad layer 32 has a sloped portion 40 because the etchant reaches farther from the etchant introduction holes 42 as the level within the clad layer 32 is higher and closer to the body layer, and also because $SiO_2$ has crystalline characteristics.

The positional relationship between the waveguide and the air-bridge cavity in (a) differs from that in (b): a part of the waveguide passes through the area 48 in (a), whereas the waveguide is entirely excluded from the area 48 in (b). However, (a) and (b) are identical with respect to the positional relationship between the waveguide and the point-like defect. In (b), an end of the area 48 is set nearly in contact with the outer edge of the point-like defect so that the point-like defect is located over the air-bridge cavity and the waveguide is located outside the air-bridge cavity.

Figure 13:
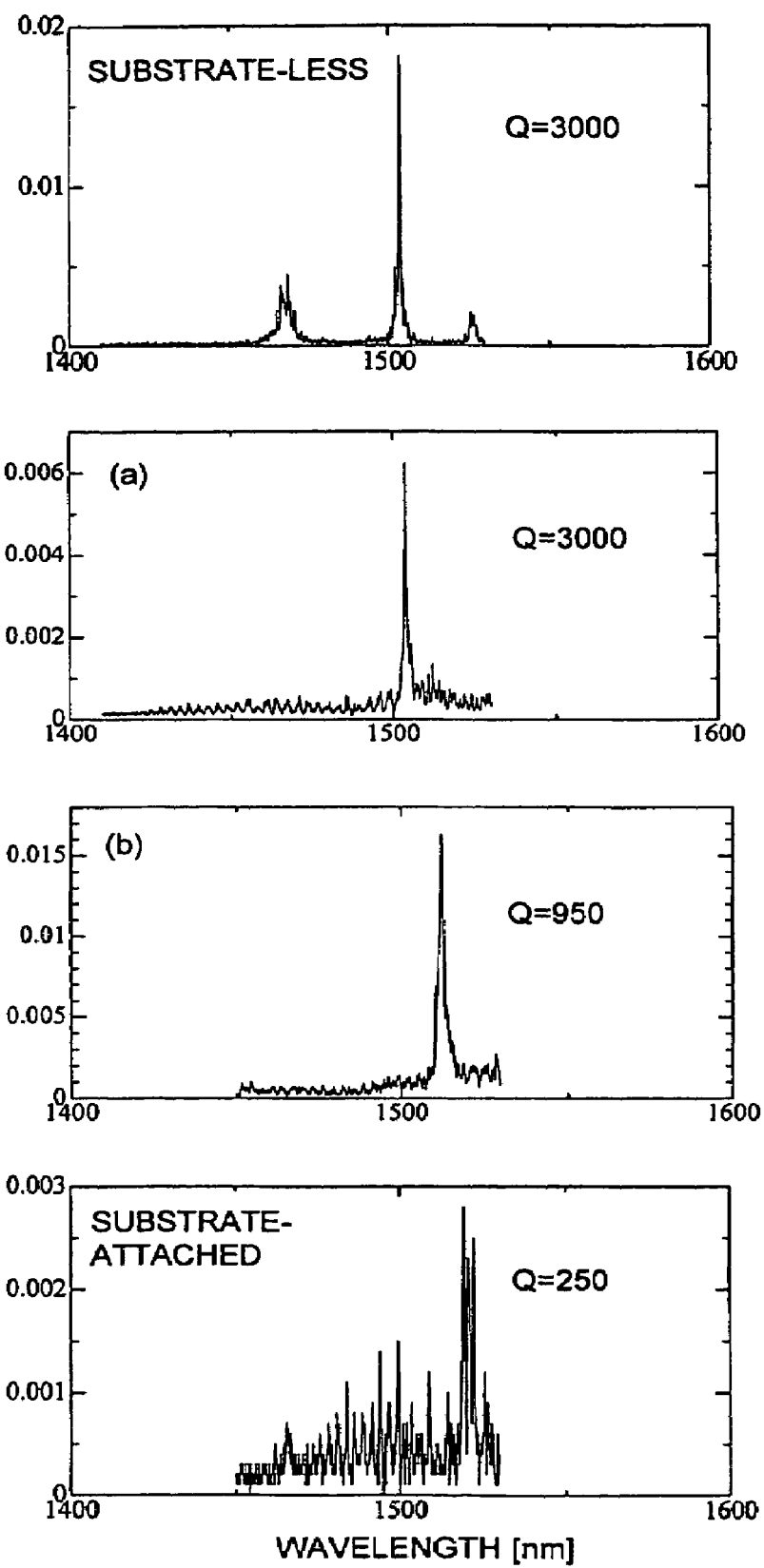
FIG. 13 shows graphs of the demultiplexing spectrums of two-dimensional photonic crystals having an air-bridge structure manufactured in Embodiment 2 and conventional two-dimensional photonic crystals.

FIG. 13 shows the spectrums of light demultiplexed from the waveguide into the point-like defect in each of the two-dimensional photonic crystals shown in FIGS. 12(a) and 12(b). FIG. 13 also shows the spectrums of light demultiplexed with a substrate-less photonic crystal and that of light demultiplexed with a substrate-attached photonic crystal. The Q-value was Q=3000 for FIG. 12(a) and Q=950 for FIG. 12(b). In both cases, the Q-value was higher than that obtained with the substrate-attached photonic crystal. Particularly, the Q-value for FIG. 12(a) was as high as that of the substrate-less photonic crystal. The Q-value for FIG. 12(b) was lower than that of the substrate-less photonic crystal. This suggests that a small amount of $SiO_2$ was remaining under the point-like defect because the outer edge of the point-like defect was located nearly in contact with an end of the area 48.

Embodiment 3

Figure 14:
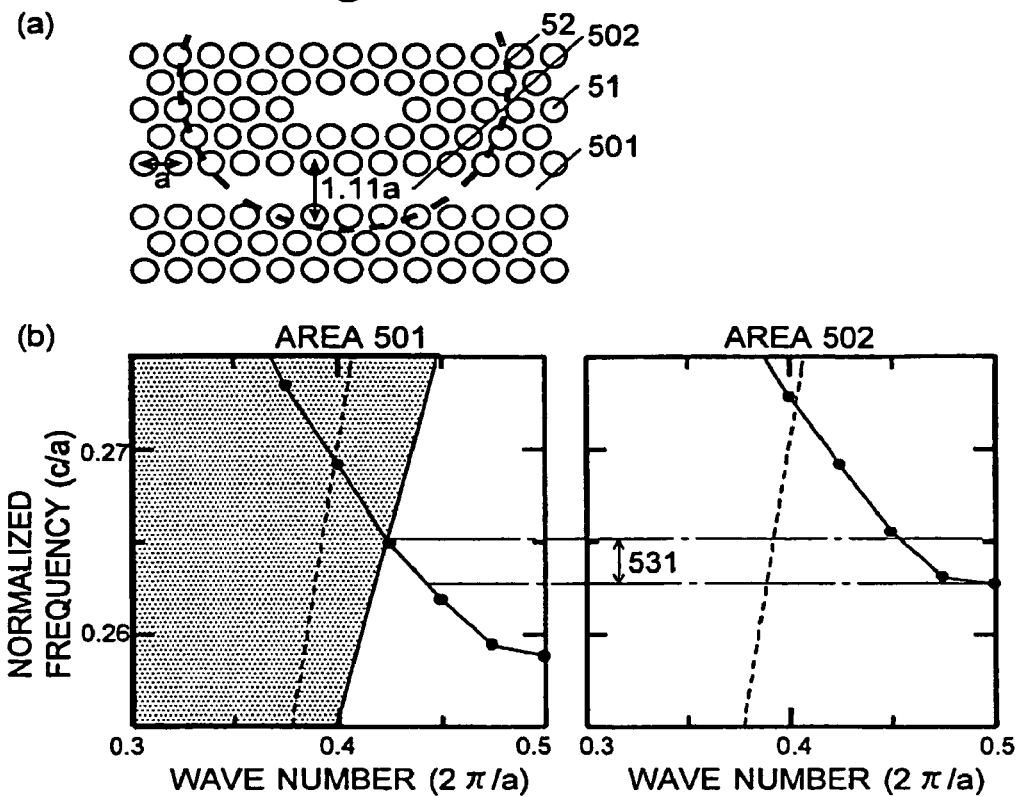
FIG. 14 shows the waveguide transmission band in the case where the width of the waveguide is uniform.

The waveguide transmission band of a waveguide located over an air-bridge space was analyzed using a two-dimensional photonic crystal having an air-bridge structure. The result is as follows:

If, as shown in FIG. 14(a), the width of the waveguide is uniform (1.11 times the cycle a of the holes 51) within both the area 501 over the $SiO_2$ substrate layer and the area 502 over the air-bridge space 52, the common band (i.e. the wavelength band within which light is allowed to pass through both areas 501 and 502) will be as denoted by numeral 531 in FIG. 14(b), where the coordinate indicates the normalized frequency (the frequency of light multiplied by the cycle of the holes 51 and divided by the speed of light) and the abscissa indicates the wave number of light. The shaded area shows the frequency band inappropriate for the waveguide transmission band because it allows the TM wave to be coupled with the TE wave within the waveguide and leak in in-plane directions.

Figure 15:
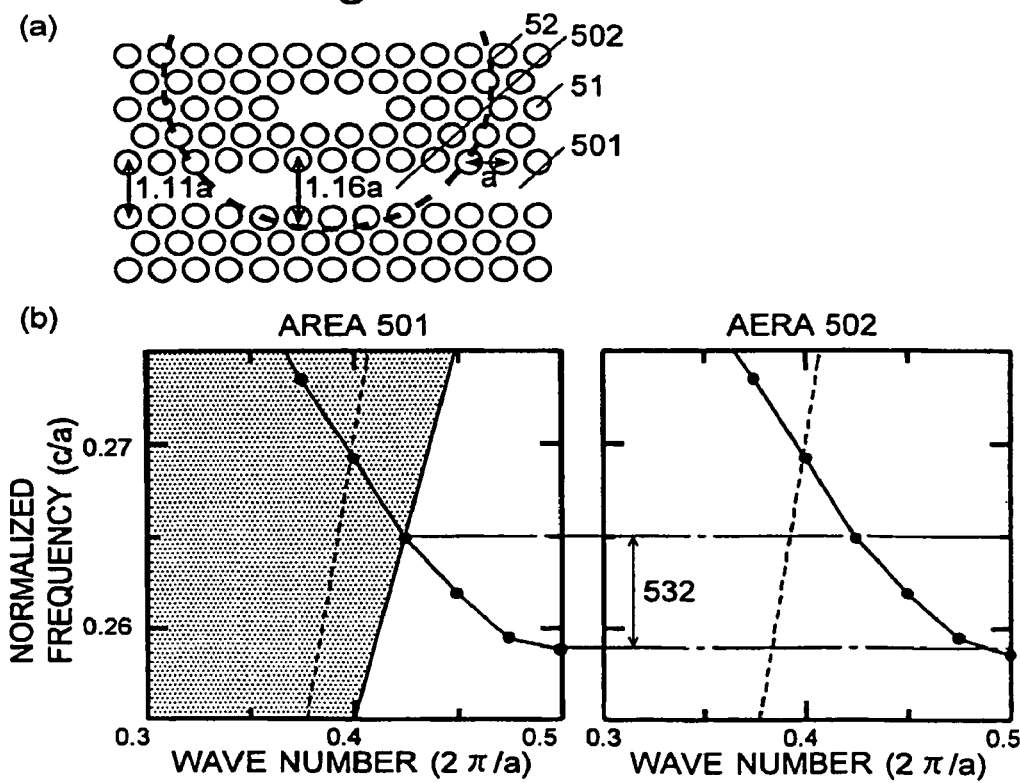
FIG. 15 shows the waveguide transmission band in the case where the waveguide located over the air-bridge space is widened.

In contrast, if, as shown in FIG. 15(a), the position of the holes 51 is changed so that the waveguide is widened within the area 502 to 1.16 times the cycle a of the holes 51, the waveguide transmission band of the area 502 shifts to lower frequencies, as shown in FIG. 15(b), so that the common band 532 is broader than in the case where the width of the waveguide is uniform.

Figure 16:
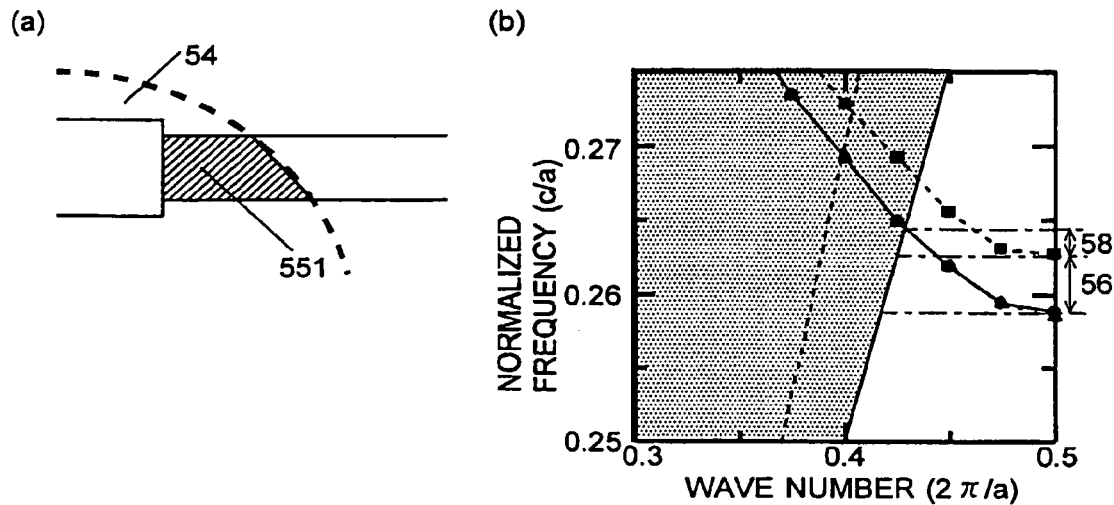
FIG. 16 shows the waveguide transmission band in the case where a narrowed section of the waveguide is located over the air-bridge space.
Figure 17:
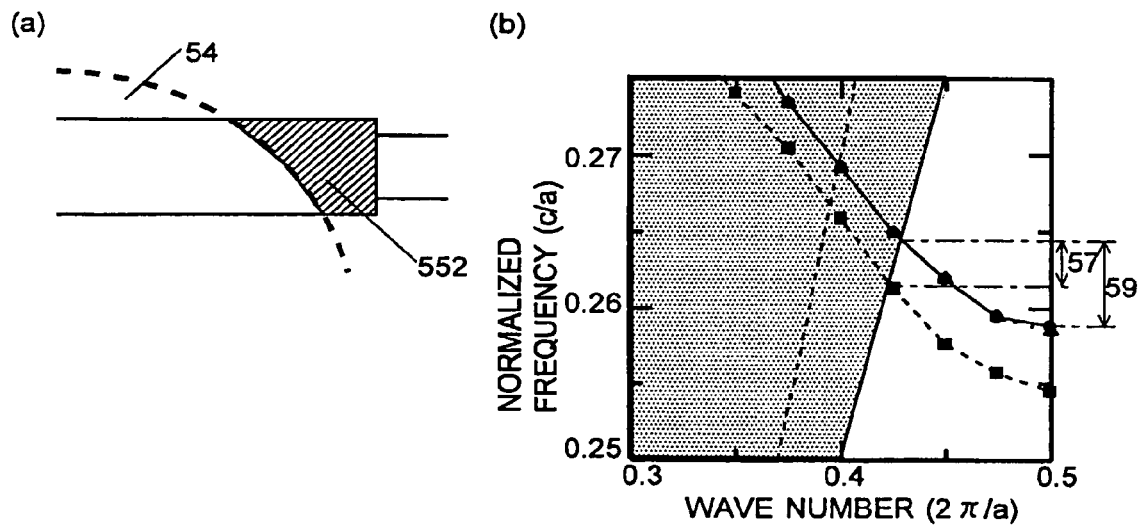
FIG. 17 shows the waveguide transmission band in the case where a widened section of the waveguide is located outside the air-bridge space.

The above-described analysis method can be used to analyze the case where the boundary of the region in which the waveguide should be widened is dislocated from the boundary of the air-bridge space in the process of manufacturing the two-dimensional photonic crystal having an air-bridge structure. If, as shown in FIG. 16(a), a narrowed section 551 of the waveguide is located over an air-bridge space 54, the light within the band 56 shown in FIG. 16(b) cannot pass through the narrow section 551 of the waveguide, so that the transmission band 57 of the entire waveguide is narrower than that in the case where the aforementioned displacement does not exist. In contrast, if, as shown in FIG. 17(a), a widened section 552 of the waveguide is located outside the air-bridge space 54, the light within the band 57 shown in FIG. 17(b) can pass through the entire waveguide, though TM waves may leak towards the in-plane direction of the slab. This leakage will not be serious if the section 552 is small. In the other wavelength band, the section 552 has no influence. Thus, the common transmission wavelength band 59 of the waveguide is maintained if the widened section 552 of the waveguide is present outside the air-bridge space 54.

Embodiment 4

Figure 18:
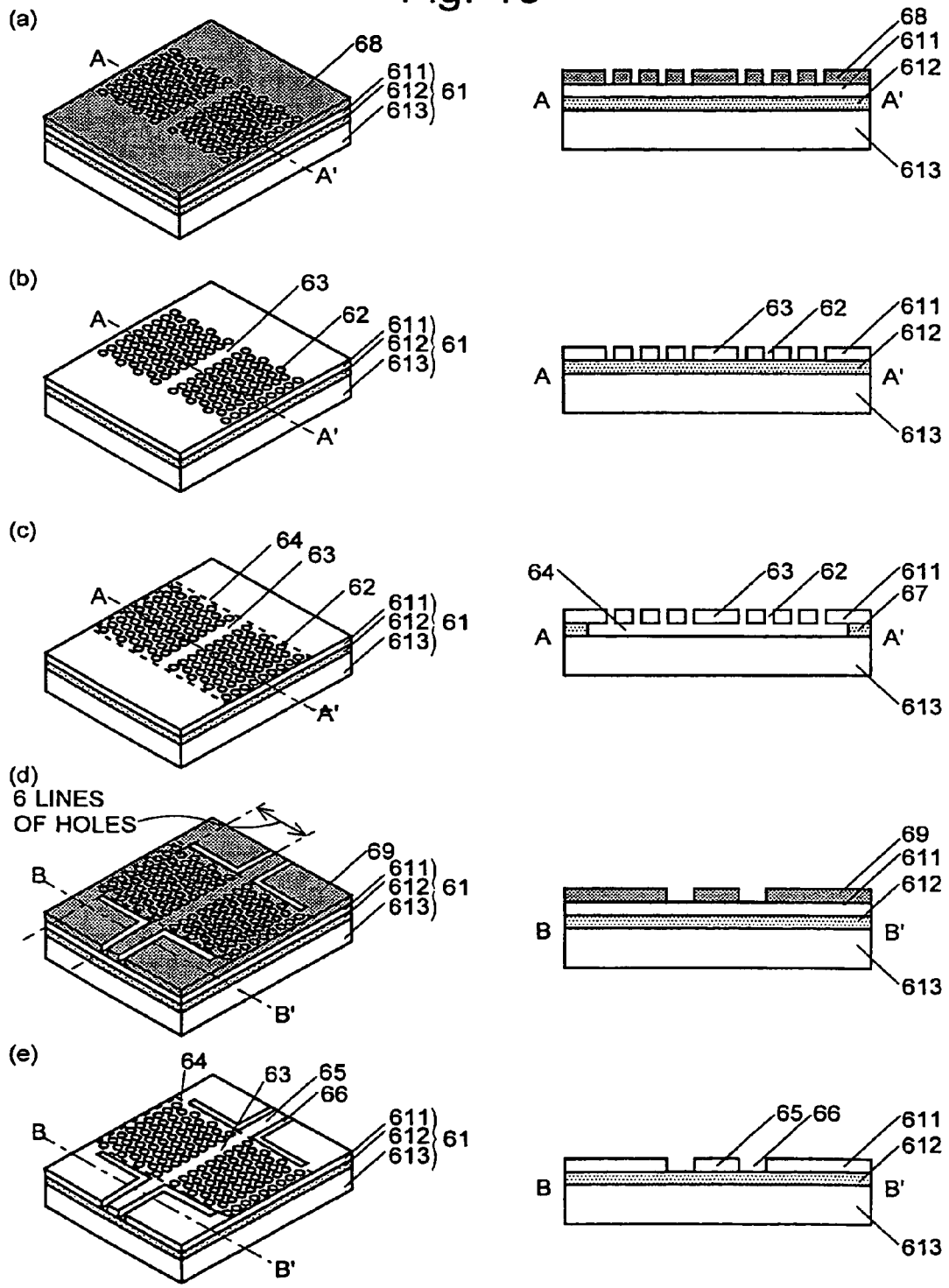
FIG. 18 includes perspective views and sectional views showing an embodiment (Embodiment 4) of the method for manufacturing the two-dimensional photonic crystal having a wire waveguide according to the second mode of the method of the present invention.
Figure 19:
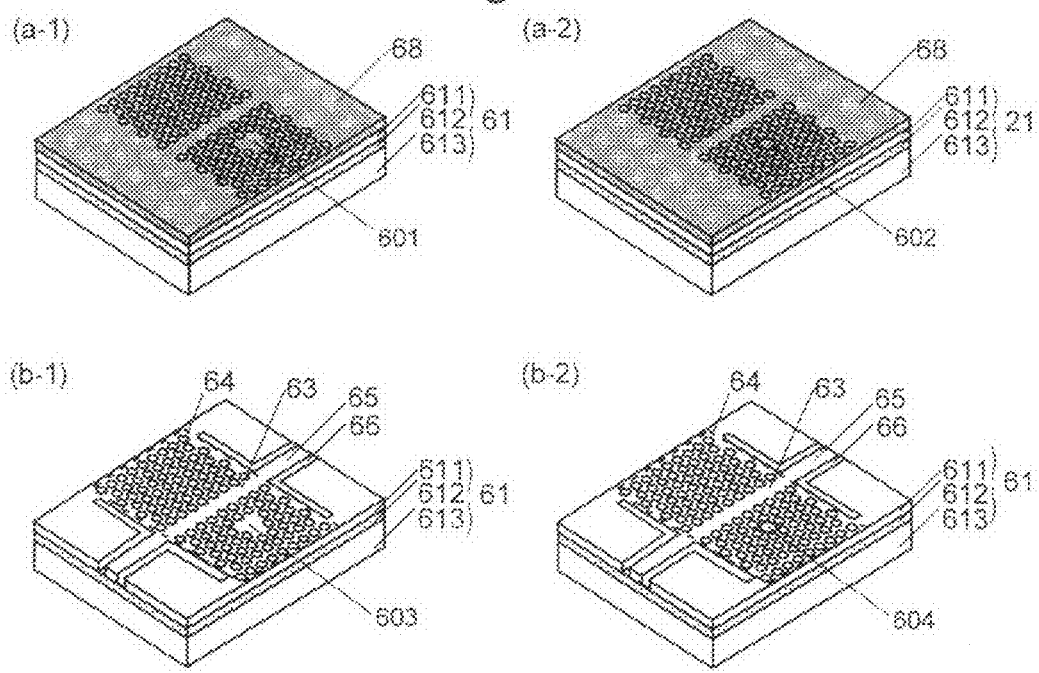
FIG. 19 shows examples of point-like defects formed in the manufacturing method of Embodiment 4.

An embodiment of the method for manufacturing the two-dimensional photonic crystal according to the second mode, i.e. a two-dimensional photonic crystal having a wire waveguide, is described with reference to FIG. 18 and FIG. 19. FIG. 18 shows the manufacturing steps by the perspective views (left) and the cross-sectional views (right) at lines A-A' and B-B' of the perspective views.

The present method uses an SOI substrate 61 composed of three layers: a slab layer 611 made of Si, a clad layer 612 made of $SiO_2$ and a silicon layer 613 made of Si. Commercial SOI substrates can be used as the SOI substrate 61. In the SOI substrate 61 used in the present embodiment, the thickness of the slab layer 611 is 0.25 μm, that of the clad layer 612 is 1.5 μm and that of the silicon layer 613 is 725 μm. First, a resist 68 is applied on the surface of the slab layer 611, and then the resist 68 is removed with an electron beam to form holes arranged in a cyclic pattern (FIG. 18(a)). In the present embodiment, the radius of the hole is 0.12 μm and the holes are arranged in a triangular pattern with a lattice constant of 0.42 μm. No hole is formed within the area corresponding to the in-crystal waveguide to be formed. The width of the in-crystal waveguide is 0.48 μm in the present embodiment. Alternatively, the in-crystal waveguide may be formed by making the shape of some holes different from the other or changing the position of some holes. Next, a dry etching process using an etching gas ($SF_6$ gas) is performed to bore holes 62 in the slab layer 611. In this process, the portion of the in-crystal waveguide 63 (and a point-like defect, if it is necessary) is protected from the etching process (FIG. 18(b)). After the etching process, the resist 68 is removed. As a result of the processes described thus far (i.e. the two-dimensional photonic crystal formation process), a two-dimensional photonic crystal is formed in the slab layer 611. At this stage, however, the lower surface of the two-dimensional photonic crystal is in contact with the clad layer 612.

Subsequently, the SOI substrate 61 is dipped into an aqueous solution of hydrogen fluoride with a concentration of 5% for ninety seconds. The aqueous solution of hydrogen fluoride introduced into the holes 62 etches only $SiO_2$ of the clad layer 612 without affecting the slab layer 611 and Si of the silicon layer 613. In this process, the clad layer 612 is etched from the holes 62 across a specific distance, and the spaces produced by the etching connect to each other between the holes. Thus, an air-bridge cavity 64 is formed under the two-dimensional photonic crystal (FIG. 18(c)). It should be noted that, in the present embodiment, no hole is formed within a zone having a specific width at each end of the slab layer 611. As a result, an end portion 67 of the clad layer 612 having a specific width is not etched and remains under each of the aforementioned zones. The remaining portions of the clad layer 612 support the two-dimensional photonic crystal.

Next, a resist 69 is applied on the slab layer 611, and then the resist 69 is removed using an electron beam by a predetermined width on both sides of the position where a wire waveguide is to be formed. In this process, the registration (or alignment) function of the electron-beam writing apparatus is to correctly form (or leave) the wire waveguide on the straight line extending from the in-crystal waveguide 63. The width of the groove equals one cycle of the hole arrangement. In the present embodiment, when the aforementioned groove is formed, another groove substantially perpendicular to the wire waveguide is also formed in the resist 69 along the outer edge of the two-dimensional photonic crystal (FIG. 18(d)). The length of the groove extending along the outer edge of the crystal equals six lines (or 5.2 cycles) of the holes, which is longer than five cycles of the hole arrangement, and its width equals one cycle of the hole arrangement, which equals the width of the grooves formed on both sides of the wire waveguide. Subsequently, a dry etching process using $SF_6$ gas is performed to form two grooves 66 in the slab layer 611. After the etching, the resist 69 is removed to obtain a wire waveguide 65 consisting of the slab layer 611 remaining between the two grooves 66 (FIG. 18(e)).

Thus, the two-dimensional photonic crystal having a wire waveguide is completed, with the air-bridge cavity 64 under the two-dimensional photonic crystal and the clad layer 612 under the wire waveguide 65. The in-crystal waveguide 63 of this two-dimensional photonic crystal having a wire waveguide does not allow light to leak into the silicon layer 613 because the air-bridge cavity 64 is present underneath. Since the lower surface of the wire waveguide 65 is in contact with the clad layer 612, the guided mode of the wire waveguide 65 is the single mode. Also, since the width of the grooves 66 on both sides of the wire waveguide 65 equals one cycle of the hole arrangement, the light within the wire waveguide 65 does not leak into the slab layer 611 located next to the wire waveguide 65. Furthermore, the light leaking from the in-crystal waveguide 63 in its width direction cannot reach the slab layer 611 located next to the wire waveguide 65, due to the presence of the groove 66 extending along the outer edge of the crystal in the direction substantially perpendicular to the wire waveguide 65 by a length equal to six lines of the holes (or 5.2 cycles).

To create a point-like defect, one possible method is to omit one or more holes located at the desired position in the above-described step illustrated in FIG. 18(a). Alternatively, it is possible to change the shape of the hole or holes located at the desired position or arrange the hole or holes so that they disorder the cyclic array. FIG. 19(a-1) shows an example in which three holes are omitted at the position 601, and FIG. 19(a-2) shows an example in which the diameter of the hole formed at the position 602 is made larger than that of the other holes. The other steps are carried out as described previously to obtain a two-dimensional photonic crystal having a wire waveguide with a point-like defect 603 created by omitting three holes (FIG. 19(b-1)) or a point-like defect 604 whose diameter is larger than that of the other holes (FIG. 19(b-2)). Detailed information about these types of point-like defects is available in Patent Document 1 and the Japanese Unexamined Patent Publication No. 2003-279764.

Figure 20:
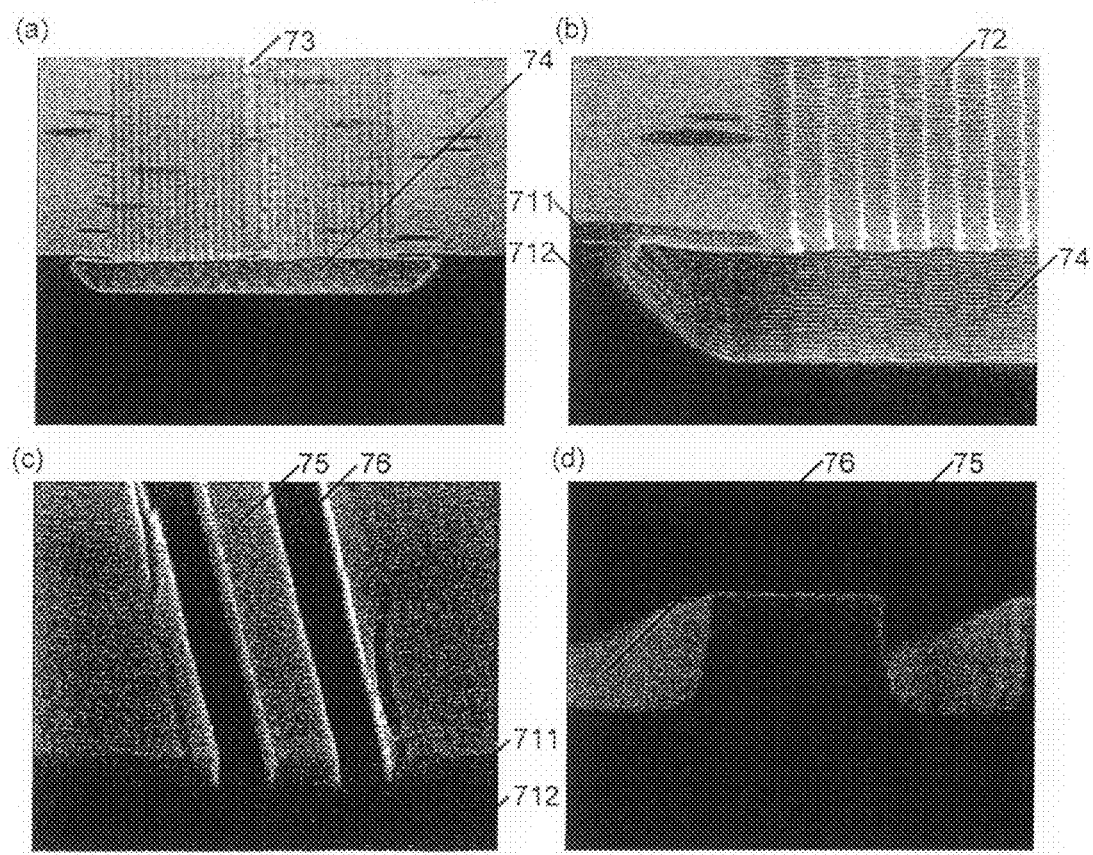
FIG. 20 shows SEM images of the two-dimensional photonic crystal having a wire waveguide manufactured in Embodiment 4.

FIG. 20 shows scanning electron microscope (SEM) images of a two-dimensional photonic crystal having a wire waveguide manufactured according to the present embodiment. FIG. 20(a) shows a cross section of the two-dimensional photonic crystal (which corresponds to the section at line A-A' in FIG. 18), obliquely observed from above, and FIG. 20(b) is an enlarged image of the cross section. These images show holes 72 cyclically arranged in the slab layer 711 and an in-crystal waveguide 73 formed by omitting one line of the holes 72. An air-bridge cavity 74 is formed under the two-dimensional photonic crystal. The clad layer 712 has a sloped portion because the etchant reaches farther from the holes 72 as the level within the clad layer 712 is higher and closer to the slab layer 711, and also because $SiO_2$ has crystalline characteristics. FIG. 20(c) shows a cross section of the wire waveguide (which corresponds to the section at line B-B' in FIG. 18), obliquely observed from above, and FIG. 20(d) shows the same cross section obliquely observed from one side. These images show a wire waveguide 75 formed between two grooves 76. Furthermore, as shown in FIG. 20(c), the lower surface of the wire waveguide 75 is in contact with the clad layer 712. As a result, the guided mode of the wire waveguide 75 becomes the single mode.

Embodiment 5

Figure 21:
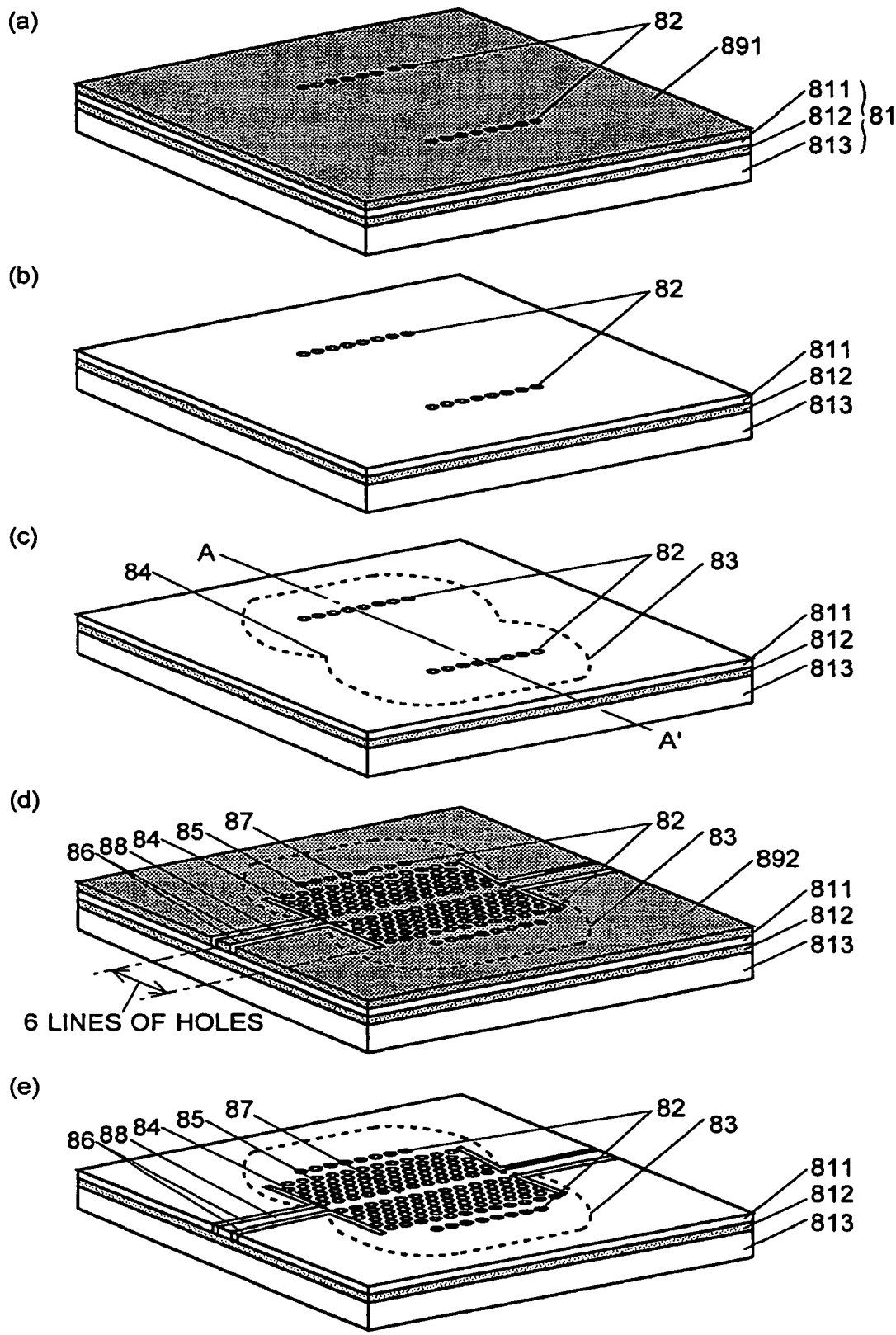
FIG. 21 includes perspective views showing an embodiment (Embodiment 5) of the method for manufacturing the two-dimensional photonic crystal having a wire waveguide according to the third mode of the method of the present invention.
Figure 22:
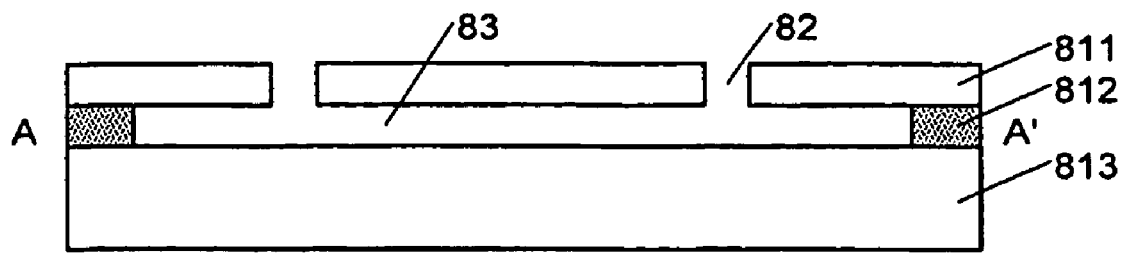
FIG. 22 is a cross-sectional view of a two-dimensional photonic crystal having a wire waveguide, showing an example of the air-bridge space.

An embodiment of the method for manufacturing the two-dimensional photonic crystal according to the third mode, i.e. a two-dimensional photonic crystal having a wire waveguide, is described with reference to FIGS. 21 and 22.

As in the fourth embodiment, the present method uses an SOI substrate 81 composed of three layers: a slab layer 811 made of Si, a clad layer 812 made of $SiO_2$ and a silicon layer 813 made of Si. First, a resist 891 is applied on the surface of the slab layer 811, and then the resist 891 is removed using an electron beam so that etchant introduction holes 82 are formed in a predetermined pattern (FIG. 21(a)). This pattern consists of holes having a radius of 0.12 μm arranged on two straight lines substantially parallel to each other. The distance between the two lines is 7.2 μm. Next, a dry etching process using an etching gas ($SF_6$ gas) is performed to bore the etchant introduction holes 82 in the slab layer 811. After the etching, the resist 891 is removed (FIG. 21(b)).

Subsequently, the SOI substrate 81 is dipped into an aqueous solution of hydrogen fluoride with a concentration of 5% for three minutes. The aqueous solution of hydrogen fluoride introduced into the etchant introduction holes 82 etches only $SiO_2$ of the clad layer 812 without affecting the slab layer 811 and Si of the silicon layer 813. In this process, the clad layer 812 is etched from the etchant introduction holes 82 across a specific distance, and an air-bridge cavity 83 is formed in the shape of two belts overlapping each other at their longer sides (FIG. 21(c)). FIG. 22 shows the air-bridge cavity observed in the cross section A-A' (shown in FIG. 6(c)) of the SOI substrate 81.

Next, a resist 892 is applied on the surface of the slab layer 811, and then the resist 892 is removed using an electron beam to form holes arranged in a cyclic pattern (d). These holes will later constitute the cyclic distribution of the refractive index in the two-dimensional photonic crystal. In the present embodiment, the radius of the hole is 0.12 μm and the holes are arranged in a triangular pattern with a lattice constant of 0.42 μm. No hole is formed within the area corresponding to the in-crystal waveguide to be formed. Alternatively, the in-crystal waveguide may be formed by making the shape of some holes different from the other or changing the position of some holes. An end of the in-crystal waveguide is adjusted to the point 84 where the arc-shaped areas of the air-bridge cavity 83 meet each other. This positioning work can be performed using the overlapping function available on commercial lithography apparatuses. The width of the in-crystal waveguide in the present embodiment is 0.48 μm. The resist 892 located on both sides of the position where the wire waveguide is to be formed is also removed using the electron beam by a predetermined width (d). The width of the groove equals one cycle of the holes 85. In the present embodiment, when the aforementioned groove is formed, another groove substantially perpendicular to the wire waveguide is also formed in the resist 892 along the outer edge of the two-dimensional photonic crystal (d). The length of the groove extending along the outer edge of the crystal equals six lines (or 5.2 cycles) of the holes 85, which is longer than five cycles of the holes 85, and its width equals one cycle of the holes 85, which equals the width of the grooves formed on both sides of the wire waveguide. Subsequently, a dry etching process using $SF_6$ gas is performed to form the holes 85 and the grooves 86 in the slab layer 811. Thus, an in-crystal waveguide 87 and a wire waveguide 88 are formed. After the etching, the resist 892 is removed (e) to complete the two-dimensional photonic crystal having a wire waveguide.

In the two-dimensional photonic crystal having a wire waveguide thus formed, the in-crystal waveguide 87 is connected to the wire waveguide 88 at the point 84. Since the air-bridge cavity 83 is present in the width direction of the waveguide from that point 84, the two-dimensional photonic crystal is entirely in contact with the air-bridge cavity. Therefore, even if a ray of light propagating through the in-crystal waveguide 87 leaks from the waveguide and spreads to a certain extent, the light will not be lost into the clad layer 812.

The presence of the air-bridge cavity 83 under the in-crystal waveguide 87 prevents the leakage of light into the silicon layer 813. Since the lower surface of the wire waveguide 88 is in contact with the clad layer 812, the guided mode of the wire waveguide 88 is the single mode, so that light will be efficiently guided between the in-crystal waveguide 87 and the wire waveguide 88. Also, since the width of the grooves 86 on both sides of the wire waveguide 88 equals one cycle of the holes 85, the light within the wire waveguide 88 cannot leak into the slab layer 811 located next to the wire waveguide. Furthermore, the light leaking from the in-crystal waveguide 87 in its width direction cannot reach the slab layer 811 located next to the wire waveguide 88, due to the presence of the groove 86 extending along the outer edge of the crystal in the direction substantially perpendicular to the wire waveguide 88 by a length equal to five lines of the holes 85.

Figure 23:
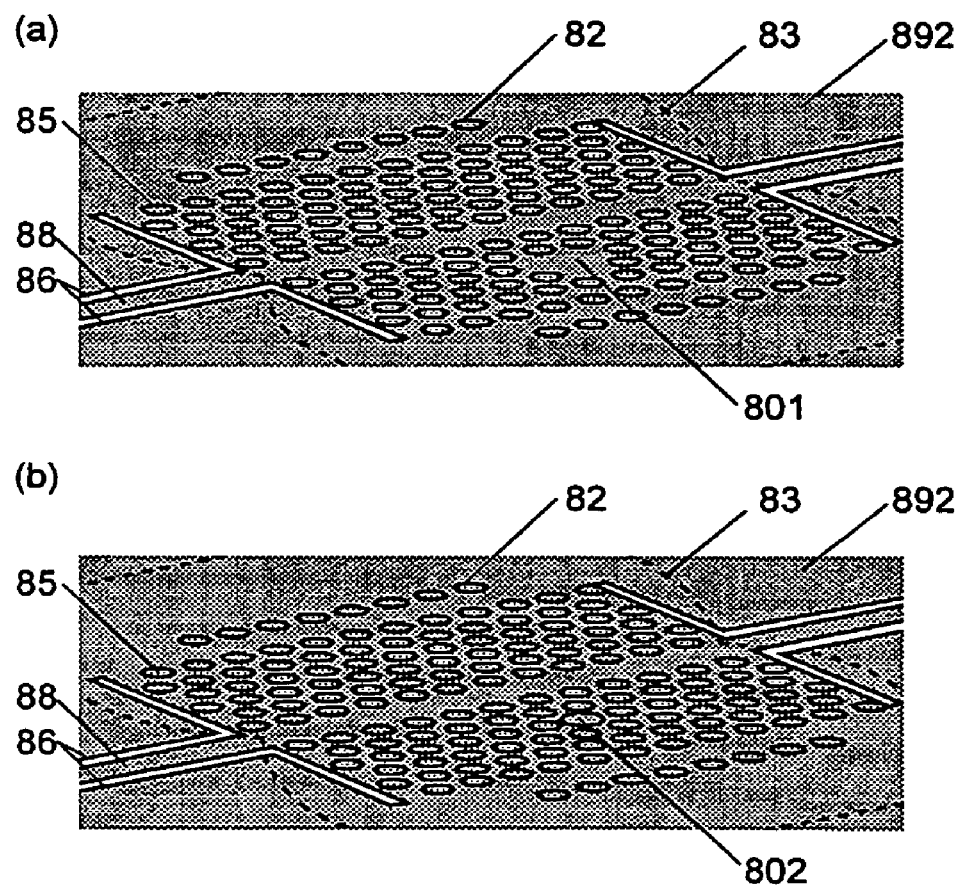
FIG. 23 includes perspective views of examples of point-like defects formed in Embodiment 5.

To create a point-like defect, one possible method is to omit one or more holes located at the desired position in the above-described step shown in FIG. 21(d). Alternatively, it is possible to change the shape of the hole or holes located at the desired position or arrange the hole or holes so that they disorder the cyclic array. FIG. 23(a) shows an example in which three holes are omitted at the position 801, and FIG. 23(b) shows an example in which the diameter of the hole formed at the position 802 is made larger than that of the other holes. The other steps are carried out as described previously to obtain a two-dimensional photonic crystal having a wire waveguide with a point-like defect created by omitting three holes (FIG. 23(a)) or a point-like defect whose diameter is larger than that of the other holes (FIG. 23(b)). The defect formed at the position 801 is the same as that formed at the position 601 (in FIG. 19(a-1)) of the fourth embodiment, and the defect formed at the position 802 is the same as that formed at the position 602 (in FIG. 19(b-1)) of the fourth embodiment.

Figure 24:
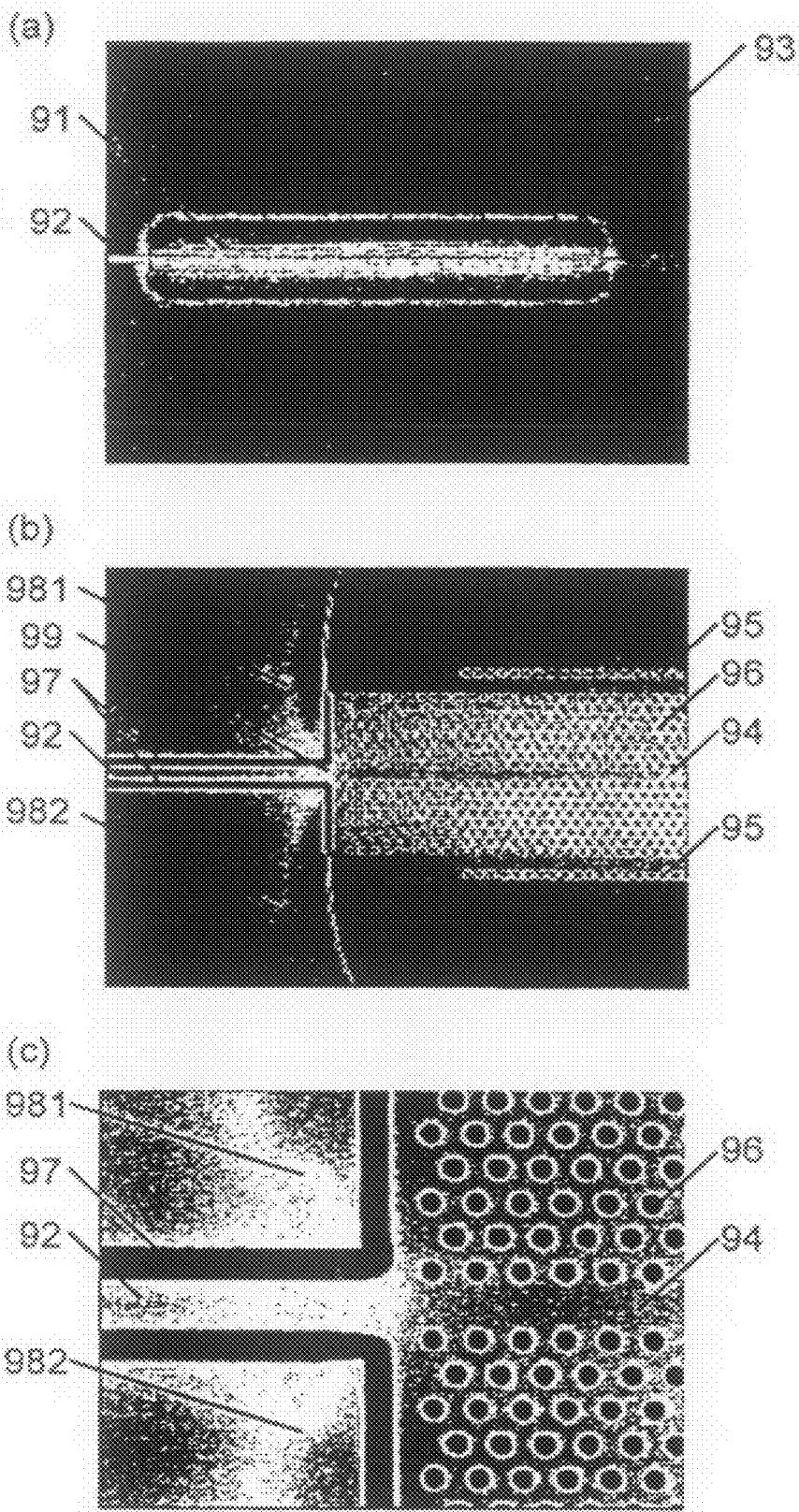
FIG. 24 includes SEM images of the two-dimensional photonic crystal having a wire waveguide manufactured in Embodiment 5.

FIG. 24 shows scanning electron microscope (SEM) images of a two-dimensional photonic crystal manufactured according to the present embodiment. FIG. 24(a) shows the top of the slab layer, in which the entirety of the two-dimensional photonic crystal 91 and a part of the wire waveguide 92 are observable. The longitudinal length of the two-dimensional photonic crystal 91 is approximately 100 μm. An air-bridge cavity 93 is formed in the clad layer under the discolored area in the images.

FIG. 24(*b*) is an enlarged image of the boundary between the in-crystal waveguide 94 and the wire waveguide 92. It shows two lines of etchant introduction holes 95 formed on both sides of the two-dimensional photonic crystal. The holes 96 of the two-dimensional photonic crystal are arranged in a triangular lattice pattern, and the in-crystal waveguide 94 is formed by omitting the holes 96 along one line. The wire waveguide 92 is formed between two grooves 97. Each groove 97 also extends from the junction of the in-crystal waveguide 94 and the wire waveguide 92 in the direction substantially perpendicular to the wire waveguide. FIG. 24(*c*) is an enlarged image of the junction. The in-crystal waveguide 94 and the wire waveguide 92 are connected to each other at the intersection 99 of two arc-shaped edges 981 and 982 of the air-bridge cavity 93. Therefore, the air-bridge cavity 93 is also present in the direction perpendicular to the waveguide from the junction, which means that the entirety of the two-dimensional photonic crystal is located over the air-bridge cavity 93.

The invention claimed is:

1. A two-dimensional photonic crystal having an air-bridge structure, comprising:
   a) a slab-shaped body;
   b) a clad layer located under the body;
   c) a plurality of modified refractive index areas arranged in the body in a lattice pattern with a predetermined cycle and having a refractive index different from that of the body;
   d) a point-like defect in the modified refractive index areas; and
   e) a space formed within the clad layer over a predetermined range and facing the point-like defect and the depth of the space is equal to or larger than two cycles of the modified refractive index areas.

2. The two-dimensional photonic crystal having the air-bridge structure according to claim 1, wherein the modified refractive index areas are created by forming holes in the body.

3. The two-dimensional photonic crystal having the air-bridge structure according to claim 1, comprising a plurality of the point-like defects.

4. The two-dimensional photonic crystal having the air-bridge structure according to claim 1, wherein the range of the space from an outer edge of the point-like defect is between one cycle and 25 cycles of the modified refractive index areas at least in one direction within the plane of the body.

5. The two-dimensional photonic crystal having the air-bridge structure according to claim 1, comprising a waveguide formed by creating a linear defect of the modified refractive index areas, located in proximity to the point-like defect.

6. A two-dimensional photonic crystal having an air-bridge structure, wherein:
   it is manufactured from a plate member having a slab layer laminated on a clad layer;
   it includes a two-dimensional photonic crystal having holes cyclically arranged in the slab layer, and a waveguide;
   a wire waveguide connected to said waveguide;
   a space formed by removing the clad layer is located under the two-dimensional photonic crystal;
   the lower portion of the wire waveguide is in contact with the clad layer; and
   the slab layer is partially removed on each side of the wire waveguide by a width equal to or larger than one cycle of the hole arrangement.

7. A two-dimensional photonic crystal having an air-bridge structure, wherein:
   it is manufactured from a plate member having a slab layer laminated on a clad layer;
   it includes a two-dimensional photonic crystal having holes cyclically arranged in the slab layer, and a waveguide;
   a wire waveguide connected to said waveguide;
   a space formed by removing the clad layer is located under the two-dimensional photonic crystal;
   the lower portion of the wire waveguide is in contact with the clad layer; and
   the slab layer is removed along an outer edge of the two-dimensional photonic crystal from the wire waveguide over a length equal to or longer than five cycles of the hole arrangement.

8. A two-dimensional photonic crystal having an air-bridge structure, comprising:
   a) a slab-shaped body;
   b) a clad layer located under the body;
   c) a plurality of modified refractive index areas arranged in the body in a lattice pattern with a predetermined cycle and having a refractive index different from that of the body;
   d) a point-like defect in the modified refractive index areas;
   e) a space formed within the clad layer over a predetermined range and facing the point-like defect; and
   f) a waveguide formed by creating a linear defect of the modified refractive index areas, located in proximity to the point-like defect, a portion of the waveguide is an air-bridge waveguide section facing the space, and the width of the waveguide is larger in the air-bridge waveguide section than that in the other section by a predetermined size.

9. The two-dimensional photonic crystal having the air-bridge structure according to claim 8, wherein the modified refractive index areas are created by forming holes in the body.

10. The two-dimensional photonic crystal having the air-bridge structure according to claim 8, comprising a plurality of the point-like defects.

11. The two-dimensional photonic crystal having the air-bridge structure according to claim 8, wherein the range of the space from an outer edge of the point-like defect is between one cycle and 25 cycles of the modified refractive index areas at least in one direction within the plane of the body.

12. The two-dimensional photonic crystal having the air-bridge structure according to claim 8, wherein the depth of the space is equal to or larger than two cycles of the modified refractive index areas.

* * * * *